US008883115B2

(12) United States Patent
Tian

(10) Patent No.: US 8,883,115 B2
(45) Date of Patent: Nov. 11, 2014

(54) TIO$_2$ NANOSTRUCTURES, MEMBRANES AND FILMS, AND METHODS OF MAKING SAME

(75) Inventor: Z. Ryan Tian, Fayetteville, AR (US)

(73) Assignee: University of Arkansas Technology Development Foundation, Fayetteville, AK (US)

(*) Notice: Subject to any disclaimer, the term of this patent is extended or adjusted under 35 U.S.C. 154(b) by 1504 days.

(21) Appl. No.: 11/653,189

(22) Filed: Jan. 12, 2007

(65) Prior Publication Data

US 2010/0255285 A1  Oct. 7, 2010

Related U.S. Application Data

(60) Provisional application No. 60/758,492, filed on Jan. 12, 2006, provisional application No. 60/785,649, filed on Mar. 23, 2006.

(51) Int. Cl.
*C01G 23/047* (2006.01)
*C01G 23/00* (2006.01)
(Continued)

(52) U.S. Cl.
CPC .............. *C01G 23/005* (2013.01); *A62D 3/176* (2013.01); *B01D 67/0046* (2013.01); *B01D 71/024* (2013.01); *B82Y 30/00* (2013.01); *C04B 35/46* (2013.01); *C04B 35/62259* (2013.01); *C08K 7/08* (2013.01); *A41D 13/1281* (2013.01); *A41D 31/0011* (2013.01); *A62D 2101/02* (2013.01); *B01D 2323/08* (2013.01); *B01J 35/004* (2013.01); *C01P 2002/72* (2013.01); *C01P 2004/03* (2013.01); *C01P 2004/04* (2013.01); *C01P 2004/16* (2013.01); *C04B 2235/5252* (2013.01); *C04B 2235/526* (2013.01); *C04B 2235/5264* (2013.01); *C04B 2235/6028* (2013.01); *H01G 9/2031* (2013.01); *Y10S 977/775* (2013.01)
USPC ............................ 423/610; 502/350; 977/775

(58) Field of Classification Search
USPC ................. 423/598, 610; 977/700, 773, 775; 502/349
See application file for complete search history.

(56) References Cited

U.S. PATENT DOCUMENTS 6,113,861 A    9/2000   Ogata
6,162,755 A    12/2000  Honnick et al.
(Continued)

FOREIGN PATENT DOCUMENTS

CN    1400169 A    3/2003

OTHER PUBLICATIONS

Yuan et al., Hierarchical interlinked structure of titanium oxide nanofibers, 2002, Chem. Commun., 1202-1203.*

(Continued)

*Primary Examiner* — Kaj K Olsen
*Assistant Examiner* — Pritesh Darji
(74) *Attorney, Agent, or Firm* — Morris, Manning & Martin, LLP; Tim Tingkang Xia, Esq.

(57) ABSTRACT

One aspect of the present invention relates to a method for synthesizing macro-sized nanostructures. The method in one embodiment comprises the steps of mixing an amount of TiO$_2$ powders with a volume of an alkali or alkaline solution to form a mixture, and heating the mixture at a temperature higher than 160° C. for a period of time effective to allow TiO$_2$-containing, macro-sized nanostructures to form, wherein the TiO$_2$-containing, macro-sized nanostructures form in an environment that has no presence of a substrate that comprises Ti. These TiO$_2$-containing, macro-sized nanostructures can be utilized to form a free standing membrane, and/or a three-dimensional (3D) structure.

11 Claims, 11 Drawing Sheets

(51) Int. Cl.

| | |
|---|---|
| *A62D 3/176* | (2007.01) |
| *B01D 67/00* | (2006.01) |
| *B01D 71/02* | (2006.01) |
| *B82Y 30/00* | (2011.01) |
| *C04B 35/46* | (2006.01) |
| *C04B 35/622* | (2006.01) |
| *C08K 7/08* | (2006.01) |
| *A41D 13/12* | (2006.01) |
| *A41D 31/00* | (2006.01) |
| *A62D 101/02* | (2007.01) |
| *B01J 35/00* | (2006.01) |
| *H01G 9/20* | (2006.01) |

(56) References Cited

U.S. PATENT DOCUMENTS

| | | |
|---|---|---|
| 6,409,928 B1 | 6/2002 | Gonzalez et al. |
| 6,409,961 B1 | 6/2002 | Koike |
| 6,503,831 B2 | 1/2003 | Speakman |
| 6,551,536 B1 | 4/2003 | Kwak et al. |
| 6,576,589 B1 | 6/2003 | Na et al. |
| 6,613,301 B2 | 9/2003 | Jang et al. |
| 6,808,561 B2 | 10/2004 | Genge et al. |
| 6,855,202 B2 | 2/2005 | Alivisatos et al. |
| 6,872,249 B2 | 3/2005 | Peng et al. |
| 6,902,653 B2 | 6/2005 | Carmignani et al. |
| 6,914,279 B2 | 7/2005 | Lu et al. |
| 6,921,476 B2 | 7/2005 | Abe et al. |
| 2002/0098977 A1 | 7/2002 | Park et al. |
| 2003/0183576 A1 | 10/2003 | Ohara et al. |
| 2003/0215355 A1 | 11/2003 | Lanz et al. |
| 2004/0131934 A1* | 7/2004 | Sugnaux et al. ............... 429/209 |
| 2005/0061732 A1 | 3/2005 | Grangeon et al. |
| 2005/0158207 A1 | 7/2005 | Lanz et al. |
| 2006/0078726 A1 | 4/2006 | Antonio et al. |
| 2006/0188774 A1 | 8/2006 | Niu et al. |
| 2006/0193766 A1 | 8/2006 | Hasegawa et al. |
| 2007/0284303 A1 | 12/2007 | Drew et al. |

OTHER PUBLICATIONS

Pondel et al., Formation fo crystallized titania nanotubes and their transformation into nanowires, 2005, Nanotechnology, 16, 1935-1940.*

Wen at al., Solvothermal synthesis of ultralong single-crystalline TiO2 nanowires, NewJ.Chem.,2005,29, 969-971.*

Tian et al., "Large Oriented Arrays and Continuous Films of TiO$_2$-Based Nanotubes," *J. Am. Chem. Soc.*, 125, 12384-12385 (2003).

Suzuki et al., "Synthesis and Thermal Analysis of TiO$_2$-Derived Nanotubes Prepared by Hydrothermal Method," *J. Mater. Res.*, 19 [4] 982-985 (2004).

Emmanuel Topoglidis et al., Direct Electrochemistry and Nitric Oxide Interaction of Heme Proteins Adsorbed on Nanocyrstalline Tin Oxide Electrodes, Langmuir, 2003, p. 6894-6900, vol. 19, No. 17.

Thomas J. Webster et al., Increased osteoblast function on PLGA composites containing nanophase titania, Journal of Biomedical Materials Research, 2005, p. 677-686, vol. 74A, No. 4.

D.V. Bavykin et al., A novel cation-binding TiO2 nanotube substrate for electro- and bioelectro-catalysis, Electrochemistry Communications, 2005, p. 1050-1058, vol. 7, No. 10.

Bavykin, Dmitry, et al., "The Effect of Hydrothermal Conditions on the Mesoporous Structure of TiO2 Nanotubes", Journal of Materials Chemistry, Jan. 1, 2004, pp. 3370-3377, vol. 14, The Royal Society of Chemistry.

Armstrong, Graham, et al., "Nanotubes with the TiO2-B Structure", Chemical Communications, Jan. 1, 2005, pp. 2454-2456, No. 19, The Royal Society of Chemistry.

Armstrong, A.R., et al., "TiO2-B Nanowires", Angewandte Chemie. International Edition, Apr. 19, 2004, pp. 2286-2288, vol. 43, Wiley-VCH Verlag GmbH & Company.

Yoshida, R., et al., "Syntheses of TiO2(B) Nanowires and TiO2 Anatase Nanowires by Hydrothermal and Post-Heat Treatments", Journal of Solid State Chemistry, Jul. 1, 2005, pp. 2179-2185, vol. 178, No. 7, Elsevier, Inc., Orlando, Florida, United States.

Yao, B.D., et al., "Formation Mechanism of TiO2 Nanotubes", Applied Physics Letters, Jan. 13, 2003, pp. 281-283, vol. 82, No. 2, American Institute of Physics, Melville, NY, United States.

Gu, Gang, "V2O5 Nanofibre Sheet Actuators", Nature Materials, Jan. 1, 2003, pp. 316-319, vol. 2, No. 5, Nature Publishing Group.

Zhengrong, R. Tian, et al., "Large Oriented Arrays and Continuous Films of TiO2-Based Nanotubes", Oct. 1, 2003, pp. 12384-12385, vol. 125, No. 41, Journal of the American Chemical Society, Albuquerque, New Mexico, United States.

Pavasupree et al., "Synthesis of titanate, TiO2 (B), and anatase TiO2 nanofibers from natural rutile sand", Journal of Solid State Chemistry, 178, 3110-3116 (2005).

Murugan, R. et al., "Nano-Featured Scaffolds for Tissue Engineering: A Reiew of Spinning Methodologies", Tissue Engineering, 2006, 12(3), 435-447.

Ellis-Behnke, R. G. et al., "Nano neuro knitting: Peptide nanofiber scaffold for brain repair and axon regeneration with functional return of vision", Proc. Natl. Acad. Sci. USA, 2006, vol. 103. No. 13, 5054-5059.

Liao, S. S. et al., "Hierarchiaclly Biomimetic Bone Scaffold Materials: Nano-HA/Collagen/PLA Composite", J. Biomed. Mater. Res., 2004, 69B(2) , 158.

Kokubo, T. et al., "Novel bioactive materials with different mechanical properties", Biomaterials, 2003, 24, 2161.

Patolsky, F. et al., "Electrical detection of single viruses", Proc. Natl. Acad. Sci. USA, 2004, vol. 101, 14017.

O'Regan, B. et al., "A low-cost, high-efficiency solar cell based on dye-sensitized colloidal TiO2 films", Nature, 1991, vol. 353, 737.

Cosnier, S. et al., "Mesoporous TiO2 Films: New Catalytic Electode Materials for Fabricating Amperometric Biosensors Based on Oxidases", Electroanalysis., 1997, vol. 9, No. 18, 1387.

Leng, Y. et al., "Deformation behavior of titanium nitride film prepared by plasma immersion ion implantation and deposition", Surf. Coat. Technol., 2002, 156(1-3), 295.

McKenzie, K. J. et al., "Accumulation and Reactivity of the Redox Protein Cytochrome c in Mesoporous Films of TiO2 Phytate", Langmuir, 2003, 19, 4327.

Topoglidis, E. et al., "Immobilisation and bioelectrochemistry of proteins on nanoporous TiO2 and ZnO film", J. Electroanal. Chem., 2001, 517, 20-27.

Topoglidis, E. et al., "Factors that Affect Protein Adsorptio and Nanostructured Titania Films. A Novel Spectroelectrochemical Application to Sensing", Langmuir, 2001, 17, 7899.

Paddon, C. A. et al., "Hemoglobin adsorption into TiO2 phytate multi-layer films: particle size and conductivity effects", Eletrochem. Commun., 2004, 6, 1249.

Zhou, H. et al., "Hemoglobin-Based Hydrogen Peroxide Biosenseor Tuned by the Photovoltaic Effect of Nano Titanium Dioxide", Anal. Chem., 2005, vol. 77, No. 18, 6102.

Liu, A. et al., "Direct Electrochemistry of Myoglobin in Titanate Nanotubes Film", Anal.Chem., 2005, 77, 8068.

Dong, W. et al., "Multifunctional, Catalytic Nanowire Membranes and the Membrane-Based 3D Devices", J. Phys. Chem. 2006, 16819.

Onda, K. et al., "wet Electrons at the H2O/TiO2(110) Surface", Science, 2005, 308, 1154.

Heimburg, T. et al., "Investigation of Secondary and Tertiary Structural Changes of Cytochrome c in Complexes with Anionic Lipids Using Amide Hydrogen Exchange Measurements: An FTIR Study", Biophys. J., 1993, 65, 2408.

Pinheiro, T. J. T. et al., "Structural and Kinetic Description of Cytochrome C Unfolding Induced by the Interaction iwht Lipid Vesicles", Biochemistry., 1997, 36, 13122.

Sanghera, N. et al., "Unfolding and refolding of cytochrome c driven by the interaction with lipid micelles", Protein Sci. 2000, 9, 1194.

(56) References Cited

OTHER PUBLICATIONS

Paquet, M-J. et al., "Two-Dimensional Infrared Correlation Spectroscopy Study of the Aggregation of Cytochrome c in the Presence of Dimyristoylphosphatidylglycerol", Biophys. J., 2001, 81, 305.

Shinohara, H. et al., Bioelectrochem. Bioenerg. 1991, 26, 307.

Baglioni, P. et al., "Structrual arrest in concentrated cytochrome C solutions: the effect of pH and salts", J. Phys: Condens. Matter, 2004, 16, S5003.

Bard, A. J. et al., "Electrochemistry and Electrogenerated Chemiluminescence from Silicon Nanocrystal Quantum Dots", Electrochemical Methods, Fundamentals and Applications, 2nd ed.; Wiley: New York, 2001.

Barker, P. D. et al., "pH-Linked Conformational Regulation of a Metalloprotein Oxidation-Reduction Equilibrium: Electrochemical Analysis of the Alkaline Form of Cytochrome c", J. Am. Chem. Soc., 1992, 114, 3619.

Perroud, D.T. et al., "Cytochrome c conformations resolved by the photon counting histogram: Watching the alkaline transition with single-molecule sensitivity", Proc. Natl. Acad. Sci. USA, 2005, 102, 17570.

Stellwagen, E., "Haem exposure as the determinate of oxidation—reduction potential of haem proteins", Nature, 1978, 275, 73.

* cited by examiner

TIO₂ NANOSTRUCTURES, MEMBRANES AND FILMS, AND METHODS OF MAKING SAME

CROSS-REFERENCE TO RELATED PATENT APPLICATION

This application claims the benefit, pursuant to 35 U.S.C. §119(e), of U.S. provisional patent application Ser. Nos. 60/758,492, filed Jan. 12, 2006, entitled "TiO₂ NANOFIBER MEMBRANES, METHODS OF MAKING SAME, AND APPLICATIONS OF SAME," by Z. Ryan Tian and Wenjun Dong, and 60/785,649, filed Mar. 23, 2006, entitled "TiO₂ NANOFIBERS, MEMBRANES, AND FILMS, METHODS OF MAKING SAME, AND APPLICATIONS OF SAME," by Z. Ryan Tian and Wenjun Dong, which are incorporated herein by reference in their entireties.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference. In terms of notation, hereinafter, "[n]" represents the nth reference cited in the reference list. For example, [10] represents the 10th reference cited in the reference list, namely, Tian, Z. R., Voigt, J,A., Liu, J., Mckenzie, B., Xu, H., J. Am. Chem. Soc., 2003, 125, 12384.

FIELD OF THE INVENTION

The present invention relates generally to nanostructures and in particular to TiO₂-containing, macro-sized nanostructures, methods of making same, and applications of same.

BACKGROUND OF THE INVENTION

Great efforts are currently devoted to the studies on one-dimensional (1D) nanostructures due to a wealth of unique physical and chemical properties associated with the 1D structural confinement in nanoscale [1]. Due to their high thermal stability and chemical inertness, inorganic nanofibers including nanowires and nanotubes can be assembled into a free standing membrane (FSM) for important applications at high temperatures and in harsh environments [2]. To make the FSM robust, the inorganic nanofibers should be ultra-long and "woven" properly. Such inorganic FSMs could then possess unique porosity, permeability, thermal stability, chemical inertness, robustness, and catalytic properties, all of which would largely differentiate the nanofiber FSMs from the monodispersed nanofibers and the bulk phases of the same/ similar chemical formula.

The fabrication of inorganic nanostructured FSM was demonstrated in 1996 on the growth of an oriented mesoporous silica film at the mica-water interface under the help of surfactant molecules [3]. Later, a different solution route to making a mesoporous FSM of anatase nanocrystallites has been developed [4]. Thereafter, fabrications of functional FSMs using 1D inorganic nanostructures have been discussed more often in literature. Recently, nanofibers of microporous manganese oxides have been cast into a paper-like FSM with a precisely controlled layer-by-layer alignment for the nanofibers [5]. Sheets of entangled V₂O₅ nanofibers were made to have the high Young's modulus, large actuator-generated stress, and significant actuator stroke at low applied voltage [6]. In addition, carbon nanotubes (CNT) have been used for fabricating functional FSMs. The buckypaper containing coaxial carbon nanotubes with improved mechanical property, thermal conductivity, and structural stability has been first reported [7]. Lately, strong, transparent, and multi-functional sheets of orthogonally organized CNTs were made with the gravimetric strength better than that of sheets of high-strength steel [8].

However, the abovementioned inorganic nanofiber FSMs may not be stable during a prolonged heating in air above 550° C. [5]. CNTs, on the other hand, may be fast oxidized in such a harsh calcination. Thus, the development of a thermal stable and chemically inert TiO₂-based nanofiber FSM would be of great interest for advancing the existing technologies in high temperature catalysis, sensing, sorption and separation. Furthermore, large scale fabrication of robust, thermal-stable, and multifunctional macroscopic three-dimensional (3D) structures directly from the 1D nanomaterials has remained as a challenge.

Therefore, a heretofore unaddressed need exists in the art to address the aforementioned deficiencies and inadequacies.

SUMMARY OF THE INVENTION

In one aspect, the present invention relates to a method for synthesizing macro-sized nanostructures. In one embodiment, the method includes the steps of mixing an amount of TiO₂ powders with a volume of an alkali or alkaline solution to form a mixture; and heating the mixture at a temperature higher than 160° C. for a period of time effective to allow TiO₂-containing, macro-sized nanostructures to form, where the TiO₂-containing, macro-sized nanostructures form in an environment that has no presence of a substrate that comprises Ti. The method further comprises the step of washing the TiO₂-containing, macro-sized nanostructures with distilled water or a dilute acid. In one embodiment, the TiO₂-containing, macro-sized nanostructures comprise substantially nanofibers with a typical diameter in the range of about 20 nm to 150 nm. The nanofibers are substantially in the TiO₂—B phase or titanate phase.

In one embodiment, the mixture is contained in a container and sealed therein. The heating step comprises the step of placing the sealed container containing the mixture in an oven for heating, where the temperature for heating the mixture is in the range of about 180-300° C., and the period of time of heating is in the range of about 3-960 hours.

In one embodiment, the alkali solution comprises one of sodium hydroxide (NaOH), potassium hydroxide (KOH), lithium hydroxide (LiOH), rubidium hydroxide (RbOH), cesium hydroxide (CsOH), and any combination of them, while the alkaline solution comprises one of magnesium hydroxide [Mg(OH)₂], or calcium hydroxide [Ca(OH)₂], strontium hydroxide [Sr(OH)₂], barium hydroxide [Ba(OH)₂], and any combination of them.

In another aspect, the present invention relates to TiO₂-containing, macro-sized nanostructures synthesized according to the above method.

In yet another aspect, the present invention relates to a synthetic nanostructure. In one embodiment, the synthetic nanostructure includes a reaction product of a chemical reaction according to the formula of:

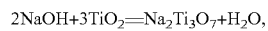

$$2NaOH + 3TiO_2 = Na_2Ti_3O_7 + H_2O,$$

where the chemical reaction takes place at a temperature higher than 160° C. for a period of time effective to allow the reaction product to form, and where the chemical reaction takes place in an environment that has no presence of a substrate that comprises Ti. In one embodiment, the chemical reaction takes place in a sealed container. The effective temperature is in the range of about 180-300° C. The effective period of time is in the range of about 3-960 hours.

In one embodiment, a first reactant $TiO_2$ is provided in the form of powders, and a second reactant that comprises an inorganic base is provided in the form of solution. In one embodiment, the second reactant comprises NaOH, and the reaction product comprises a compound of the formula $Na_2Ti_3O_7$. The compound of the formula $Na_2Ti_3O_7$, in one embodiment, is in the form of nanofiber with a typical diameter in the range of 20 nm to 150 nm.

In a further aspect, the present invention relates to a synthetic nanostructure. In one embodiment, the synthetic nanostructure includes a reaction product of several chemical reactions in sequence according to the formulae of:

$$2NaOH + 3TiO_2 \rightarrow Na_2Ti_3O_7; \tag{a}$$

$$Na_2Ti_3O_7 + 2H^+ \rightarrow 2Na^+ + H_2Ti_3O_7; \text{ and} \tag{b}$$

$$H_2Ti_3O_7 \rightarrow H_2O + TiO_2 - B, \tag{c}$$

where at least chemical reaction (a) takes place at a temperature higher than 160° C. for a period of time effective to allow the reaction product to form, and where at least chemical reaction (a) takes place in an environment that has no presence of a substrate that comprises Ti. In one embodiment, the effective temperature is in the range of about 180-300° C. The effective period of time is in the range of about 3-960 hours.

In one embodiment, a first reactant $TiO_2$ is provided in the form of powders, a second reactant that comprises an inorganic base is provided in the form of solution. The second reactant in one embodiment comprises NaOH. In another embodiment, the second reactant comprises $OH^-$. The reaction product comprises a compound of the formula $Na_2Ti_3O_7$, where the compound of the formula $Na_2Ti_3O_7$ is in the form of macro-sized nanofibers with a typical diameter in the range of 20 nm to 150 nm.

In one embodiment, at least chemical reaction (a) takes place in a sealed container. Chemical reaction (b) takes place substantially between 180° C. and 300° C. for a period of time effective to allow the compound of the formula $H_2Ti_3O_7$ is in the form of macro-sized nanofibers to form. Chemical reaction (c) takes place in a calcination process, where the calcination process comprises one of a step of heating in a furnace at a temperature in the range of 300-600° C. in air and a step of burning in air.

The chemical reaction (c) causes the compound of the formula $TiO_2$—B to form in the form of macro-sized nanofibers, where the compound of the formula $TiO_2$—B is in the form of macro-sized nanofibers with a typical diameter in the range of 20 nm to 150 nm.

In yet a further aspect, the present invention relates to a method for synthesizing macro-sized nanostructures. In one embodiment, the method includes the step of heating a mixture of a solution and a reagent at a heating temperature for a period of time effective for the growth of reagent-based, macro-sized nanostructures, where the reagent-based, macro-sized nanostructures grow in an environment that has no presence of a substrate that is seeded with the reagent.

In one embodiment, the heating temperature is greater than 160° C. The period of time of heating is in the range of about 3-960 hours. The macro-sized nanostructures comprise nanofibers, nanotubes, nanowires, or any combinations of them.

In one embodiment, the mixture of the solution and the reagent is contained in a container and sealed therein. The reagent comprises $TiO_2$ powders, and the solution comprises an alkali or alkaline solution.

In one aspect, the present invention relates to macro-sized nanostructures synthesized according to the method as disclosed above.

In another aspect, the present invention relates to a method for fabricating a free standing membrane. In one embodiment, the method includes the steps of providing a plurality of $TiO_2$-containing, macro-sized nanostructures; casting the plurality of $TiO_2$-containing, macro-sized nanostructures over a template film to form a free standing membrane over the template film; and drying the free standing membrane over the template film at a temperature for a period of time. In one embodiment, the free standing membrane is formed with multi-layers, and has a thickness in a range of about 10-1,000 micrometers. The free standing membrane is porous, permeable and zeolitic, chemically inert, biocompatible, and/or thermally stable.

The method further includes the step of removing the dried free standing membrane from the template film, where the removing step comprises the step of calcining the dried free standing membrane over the template film at a temperature in the range of 300-600° C. In one embodiment, the template film in one embodiment comprises one of an ashless filter paper and a polyethylene film.

In one embodiment, the providing step comprises the steps of mixing an amount of $TiO_2$ powders with a volume of an alkali or alkaline solution to form a mixture; and heating the mixture at a temperature higher than 160° C. for a period of time effective to allow $TiO_2$-containing, macro-sized nanostructures to form, where the $TiO_2$-containing, macro-sized nanostructures form in an environment that has no presence of a substrate that comprises Ti. The $TiO_2$-containing, macro-sized nanostructures comprise substantially $TiO_2$—B nanofibers with a typical diameter in the range of 20 nm to 150 nm.

In one embodiment, the casting step comprises the steps of casting a first plurality of $TiO_2$-containing, macro-sized nanostructures over the template film; drying the first plurality of $TiO_2$-containing, macro-sized nanostructures cast over the template film at RT for a first period of time; subsequently casting at least one additional plurality of $TiO_2$-containing, macro-sized nanostructures over the dried first plurality of $TiO_2$-containing, macro-sized nanostructures cast over the template film; and drying the at least one additional plurality of $TiO_2$-containing, macro-sized nanostructures cast over the dried first collection of $TiO_2$-containing, macro-sized nanostructures cast over the template film at RT for a second period of time that is substantially different from or equal to the first period of time.

In one embodiment, the temperature of drying is substantially in the range of about 0-180° C. The period of time of drying is substantially in the range of about 0.5-30 hours.

In yet another aspect, the present invention relates to a free standing membrane fabricated according to the above method. The template film is substantially two-dimensional, and the free standing membrane as formed is substantially two-dimensional.

In a further aspect, the present invention relates to a free standing membrane. In one embodiment, the free standing membrane has a plurality of layers of $TiO_2$-containing, macro-sized nanostructures. The $TiO_2$-containing, macro-sized nanostructures are synthesized by mixing an amount of $TiO_2$ powders with a volume of an alkali or alkaline solution to form a mixture; and heating the mixture at a temperature higher than 160° C. for a period of time effective to allow the TiO$_2$-containing, macro-sized nanostructures to form, where the TiO$_2$-containing, macro-sized nanostructures form in an environment that has no presence of a substrate that comprises Ti.

In one embodiment, the TiO$_2$-containing, macro-sized nanostructures comprise substantially TiO$_2$-containing nanofibers with a typical diameter in the range of 20 nm to 150 nm and a TiO$_2$—B structure, where the TiO$_2$-containing nanofibers in each layer are at least partially intertwined, thereby forming a plurality of voids therein.

The free standing membrane has a thickness in a range of from tens to hundreds of micrometers. The free standing membrane is porous, permeable and zeolitic, chemically inert, biocompatible, and/or thermally stable.

In yet a further aspect, the present invention relates to a method for fabricating a 3D structure directly from nanostructures. In one embodiment, the method includes the steps of providing a plurality of TiO$_2$-containing, macro-sized nanostructures; casting the plurality of TiO$_2$-containing, macro-sized nanostructures over a template for forming a 3D structure over the template, where the template has a configuration corresponding to the 3D structure to be formed; and drying the 3D structure over the template at a temperature for a period of time. The TiO$_2$-containing, macro-sized nanostructures comprise nanofibers, nanotubes, nanowires, or any combinations of them.

The method further includes the step of removing the dried 3D structure from the template, where the removing step comprises the step of calcining the dried 3D structure over the template at a temperature in the range of 300-600° C. In one embodiment, the template is formed at least partially with one of an ashless filter paper and a polyethylene film.

The casting step in one embodiment comprises the steps of casting a first plurality of TiO$_2$-containing, macro-sized nanostructures over the template; drying the first plurality of TiO$_2$-containing, macro-sized nanostructures cast over the template at RT for a first period of time; subsequently casting at least one additional plurality of TiO$_2$-containing, macro-sized nanostructures over the dried first plurality of TiO$_2$-containing, macro-sized nanostructures cast over the template; and drying the at least one additional collection of TiO$_2$-containing, macro-sized nanostructures cast over the dried first plurality of TiO$_2$-containing, macro-sized nanostructures cast over the template at RT for a second period of time that is substantially different from or equal to the first period of time.

In one embodiment, the temperature of drying is substantially in the range of about 0-180° C. The period of time of drying is substantially in the range of about 0.5-30 hours.

In one embodiment, at least a portion of the 3D structure has a thickness in a range of from tens to hundreds of micrometers. At least a portion of the 3D structure is porous, permeable and zeolitic. In one embodiment, the 3D structure is chemically inert, biocompatible, and/or thermally stable.

In one aspect, the present invention relates to a 3D structure fabricated according to the method as disclosed above. At least a portion of the 3D structure is formed with multi-layers.

In another aspect, the present invention relates to a 3D structure. In one embodiment, the 3D structure includes a plurality of layers of TiO$_2$-containing, macro-sized nanostructures. The TiO$_2$-containing, macro-sized nanostructures are synthesized by the steps of mixing an amount of TiO$_2$ powders with a volume of an alkali or alkaline solution to form a mixture; and heating the mixture at a temperature higher than 160° C. for a period of time effective to allow TiO$_2$-containing, macro-sized nanostructures to form, where the TiO$_2$-containing, macro-sized nanostructures form in an environment that has no presence of a substrate that comprises Ti. The TiO$_2$-containing, macro-sized nanostructures comprise substantially TiO$_2$-containing nanofibers with a typical diameter in the range of 20 nm to 150 nm and a TiO$_2$—B structure, where the TiO$_2$-containing nanofibers in each layer are at least partially intertwined, thereby forming 3D voids therein.

In one embodiment, at least portion of the 3D structure has a thickness in a range of from tens to hundreds of micrometers. At least portion of the 3D structure is porous, permeable and zeolitic. The 3D structure is chemically inert and/or thermally stable.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
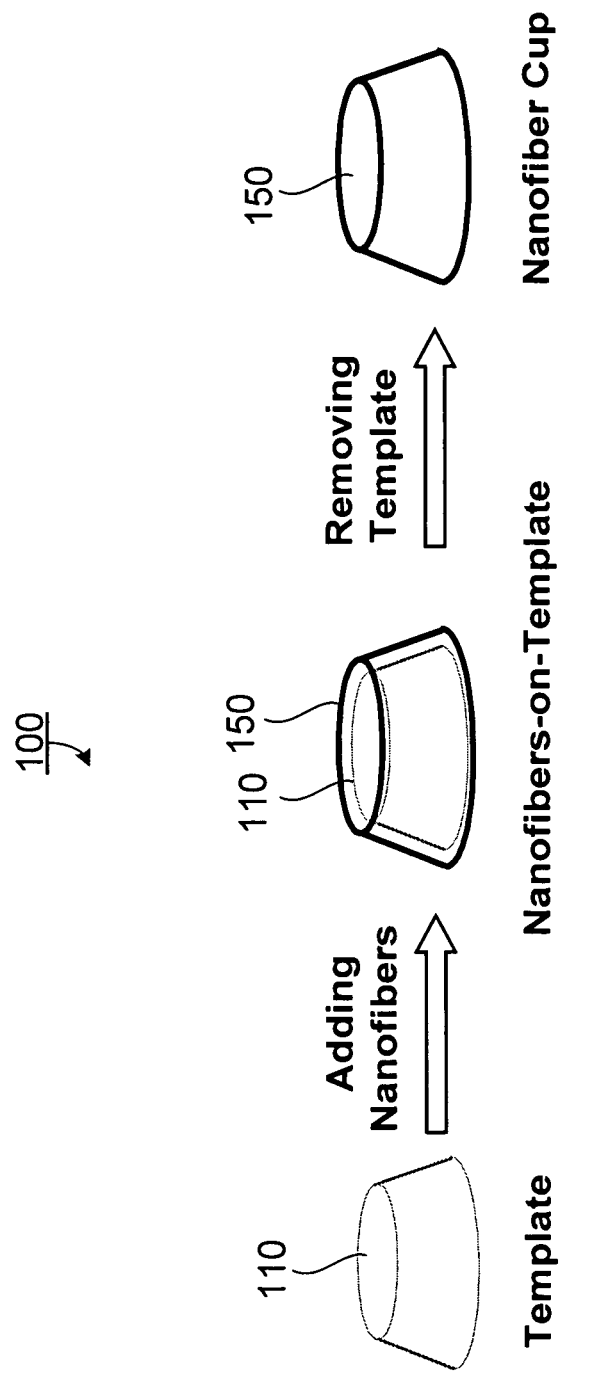
FIG. 1 shows schematically a process of fabrication of a nanofiber cup according to one embodiment of the present invention.
Figure 2:
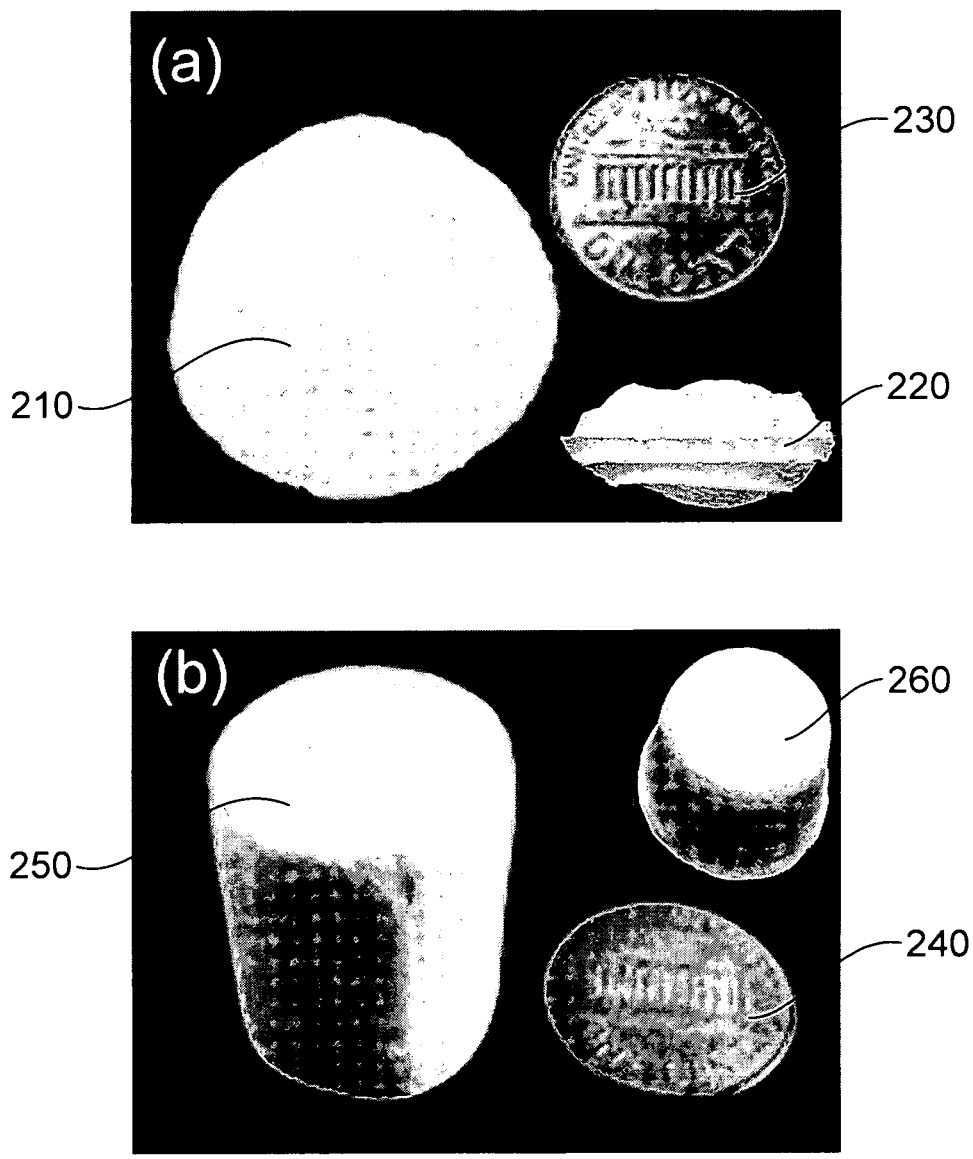
FIG. 2 shows images of flexible nanofiber-based FSMs and cups fabricated according to embodiments of the present invention: (a) a plane FSM and a folded FSM (inset), and (b) FSM cups made on a filter paper template and a plastic template (inset)

The present invention is more particularly described in the following examples that are intended as illustrative only since numerous modifications and variations therein will be apparent to those skilled in the art. Various embodiments of the invention are now described in detail. Referring to the drawings of FIGS. 1-11, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention. Additionally, some terms used in this specification are more specifically defined below.

DEFINITIONS

The terms used in this specification generally have their ordinary meanings in the art, within the context of the invention, and in the specific context where each term is used.

Certain terms that are used to describe the invention are discussed below, or elsewhere in the specification, to provide additional guidance to the practitioner in describing the apparatus and methods of the invention and how to make and use them. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification. Furthermore, subtitles may be used to help a reader of the specification to read through the specification, which the usage of subtitles, however, has no influence on the scope of the invention.

As used herein, "about" or "approximately" shall generally mean within 20 percent, preferably within 10 percent, and more preferably within 5 percent of a given value or range. Numerical quantities given herein are approximate, meaning that the term "about" or "approximately" can be inferred if not expressly stated.

As used herein, the term "photocatalysis" refers to a process of the acceleration of a photoreaction in the presence of a photocatalyst. When a photocatalyst $TiO_2$ captures ultraviolet light (UV) either from sunlight or fluorescent light, it forms activated oxygen from water or oxygen in the air. This process is similar to photosynthesis, in which chlorophyll captures sunlight to turn water and carbon dioxide into oxygen and glucose. The formed activated oxygen is strong enough to oxidize and decompose organic materials, pollutants or smelling gas, and kill bacteria.

Overview of the Invention

Making large-scale, multifunctional, paper-like FSMs and the FSM-based 3D macroscopic devices purely from long inorganic functional nanowires is challenging in many nanomaterial systems. The present invention, among other things, discloses methods of synthesis of macro-sized nanostructures and direct fabrications of FSMs and FSM-based 3D devices using the macro-sized nanostructures, and also potential applications in photocatalysis, writing-erasing-rewriting information, microfiltration, controlled drug release, and the likes.

The description will be made as to the embodiments of the present invention in conjunction with the accompanying drawings of FIGS. 1-11. In accordance with the purposes of this invention, as embodied and broadly described herein, this invention, in one aspect, relates to a method for synthesizing $TiO_2$-containing, macro-sized nanostructures including nanofibers, nanotubes, nanowires, or any combination of them.

According to the present invention, in one embodiment, $TiO_2$-containing, macro-sized nanostructures are synthesized by mixing an amount of $TiO_2$ powders with a volume of an alkali or alkaline solution to form a mixture that is contained in a containers and sealed therein, placing the sealed container containing the mixture in an oven for heating, and then heating the mixture therein at a temperature higher than 160° C. for a period of time effective to allow $TiO_2$-containing, macro-sized nanostructures to form. In one embodiment, the temperature for heating the mixture is in the range of about 180-300° C., and the period of time of heating is in the range of about 3-960 hours. The formed $TiO_2$-containing, macro-sized nanostructures is then washed with distilled water or a dilute acid.

The alkali solution can be one of NaOH, p KOH, LiOH, RbOH, CsOH, and any combinations of them. The alkaline solution can be one of $Mg(OH)_2$, $Ca(OH)_2$, $Sr(OH)_2$, $Ba(OH)_2$, and any combinations of them.

Figure 3:
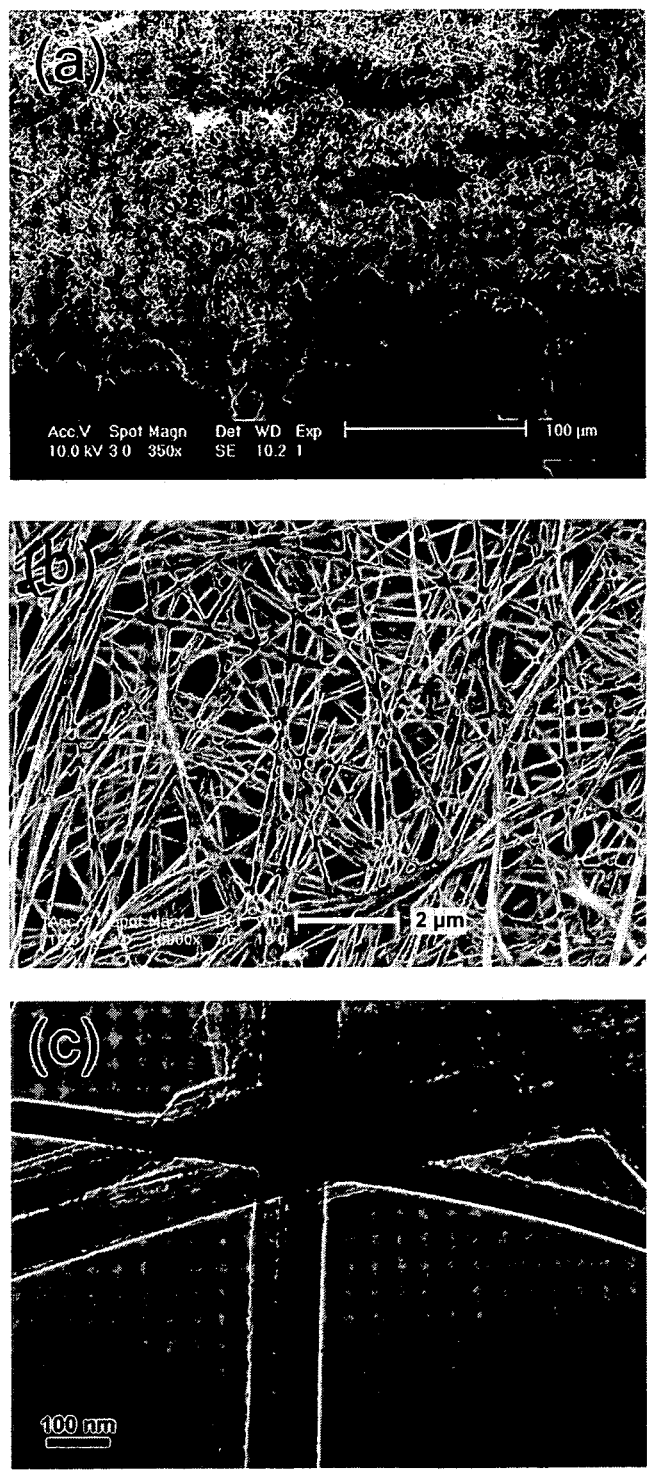
FIG. 3 shows images of SEM (scanning electron microscope), FESEM (field emission scanning electron microscope) and TEM (transmission electron microscope) images of a nanofiber FSM according to one embodiment of the present invention: (a) an SEM image of the cross-section of the nanofiber FSM showing a multi-layered texture, (b) a high resolution FESEM image of the nanofiber FSM showing the intertwined nanofibers, and (c) a TEM image of the nanofibers of the nanofiber FSM.
Figure 4:
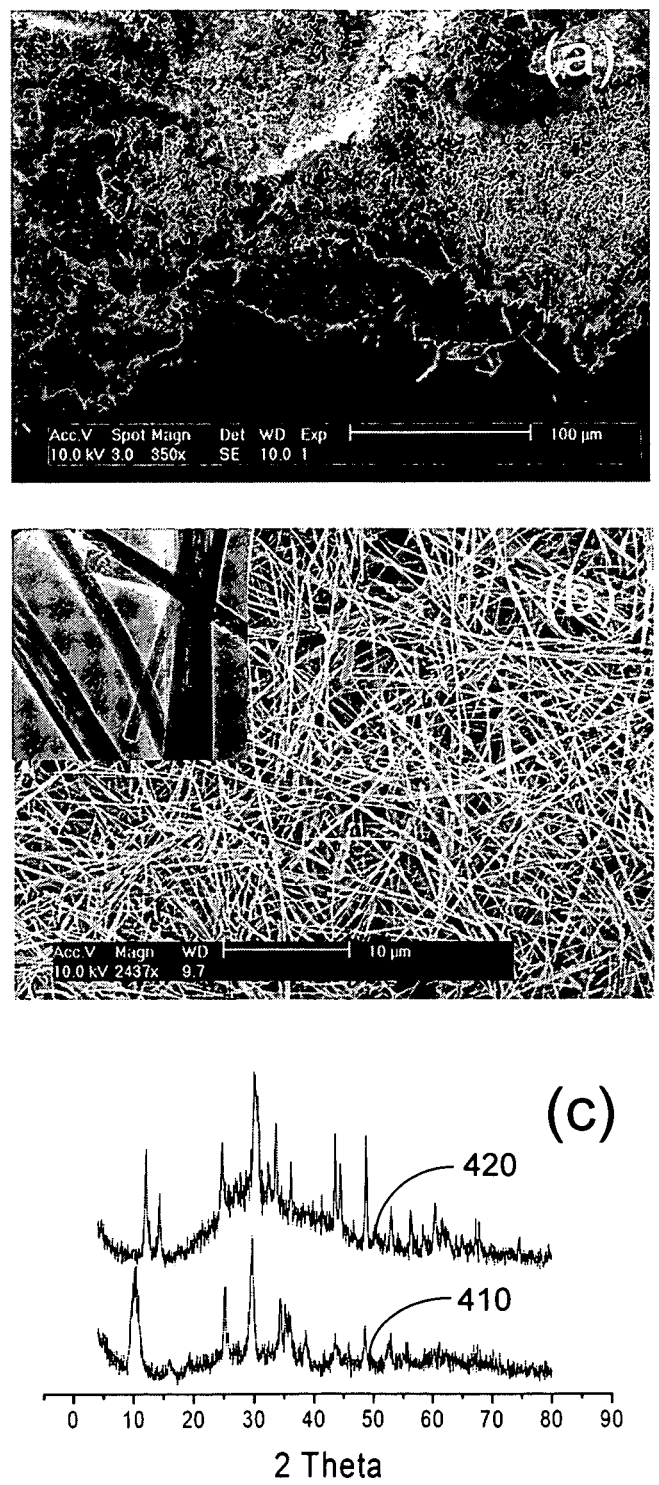
FIG. 4 shows SEM, FESEM and TEM images of a calcined nanofiber FSM according to one embodiment of the present invention: (a) an SEM image of the cross-section of the nanofiber FSM showing a multi-layered texture after the calcination at a temperature about 700° C., and (b) a high resolution FESEM image of the nanofiber FSM showing intertwined nanofibers after the calcination at a temperature about 700° C., and (inset) a TEM image of the calcined TiO$_2$ nanofibers, and (c) X-ray powder diffraction pattern of a paper of titanate nanofibers before and after calcined at about 700° C. for about 3 hours.
Figure 5:
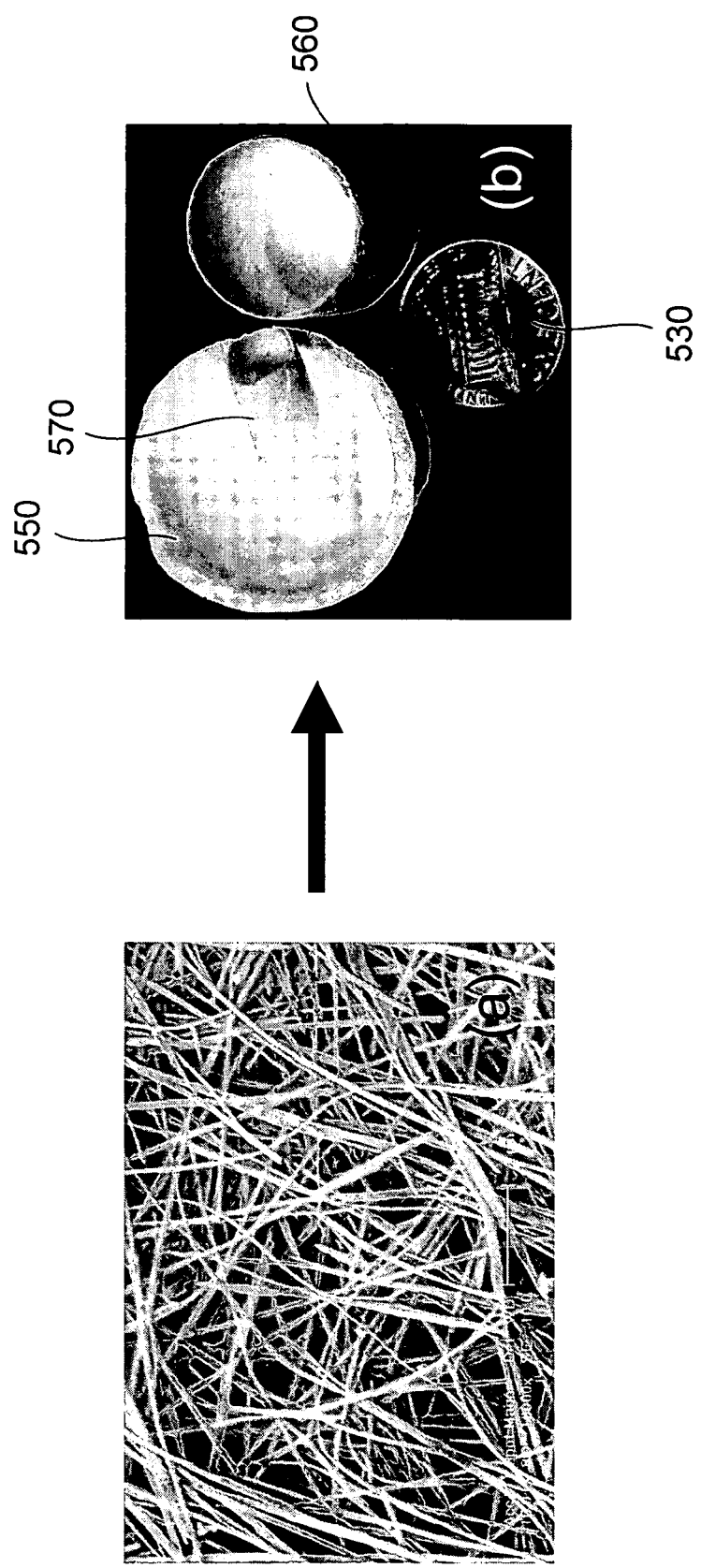
FIG. 5 shows (a) a high resolution FESEM image of a nanofiber FSM having the intertwined nanofibers, and (b) images of nanofiber cups and tubes made of the nanofiber FSM according to one embodiment of the present invention.
Figure 6:
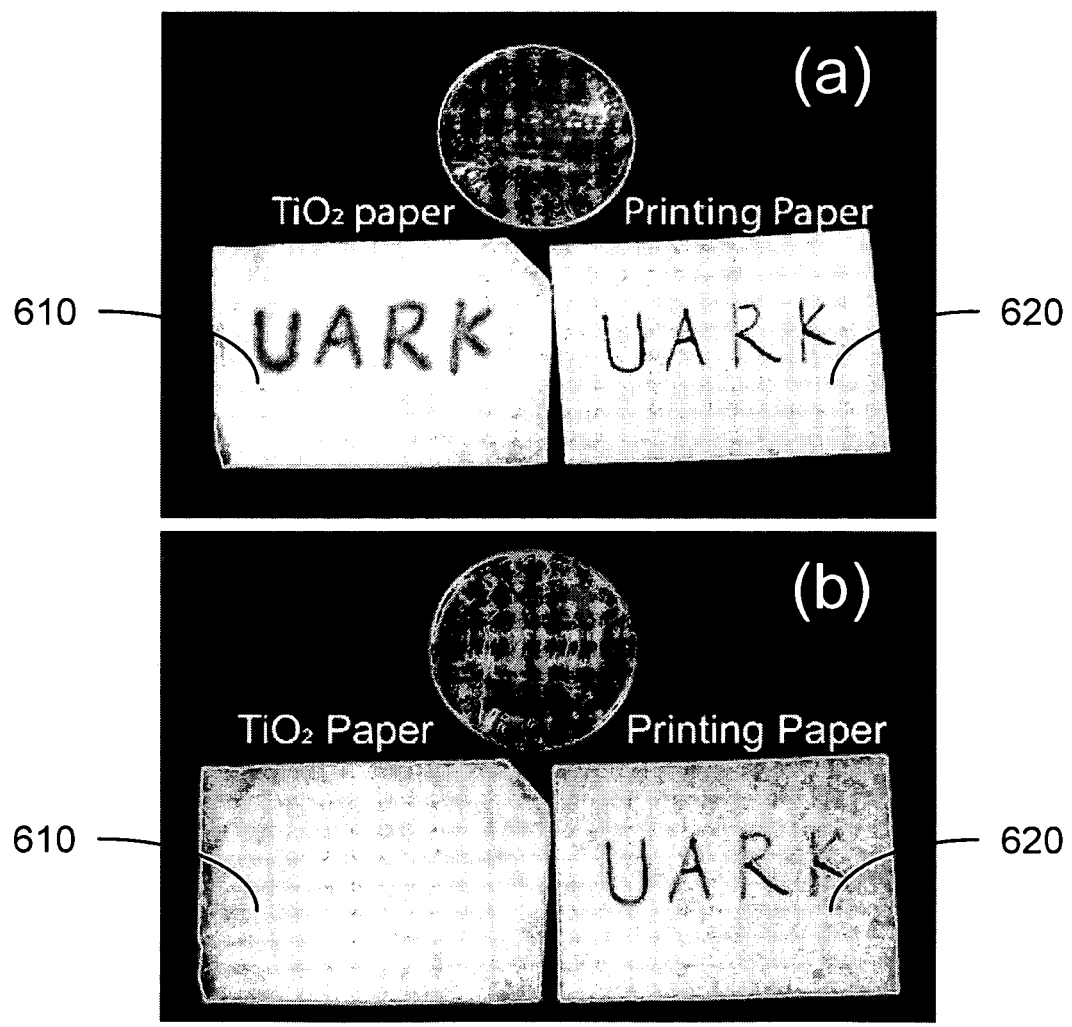
FIG. 6 shows photoassisted information writing-erasing on a nanofiber FSM paper according to one embodiment of the present invention and a regular printing paper, (a) the fourth writing of information on the nanofiber FSM paper and the first writing of information on the printing paper using the ink of crystal violet, and (b) the fourth erasing of information by the UV irradiation.
Figure 7:
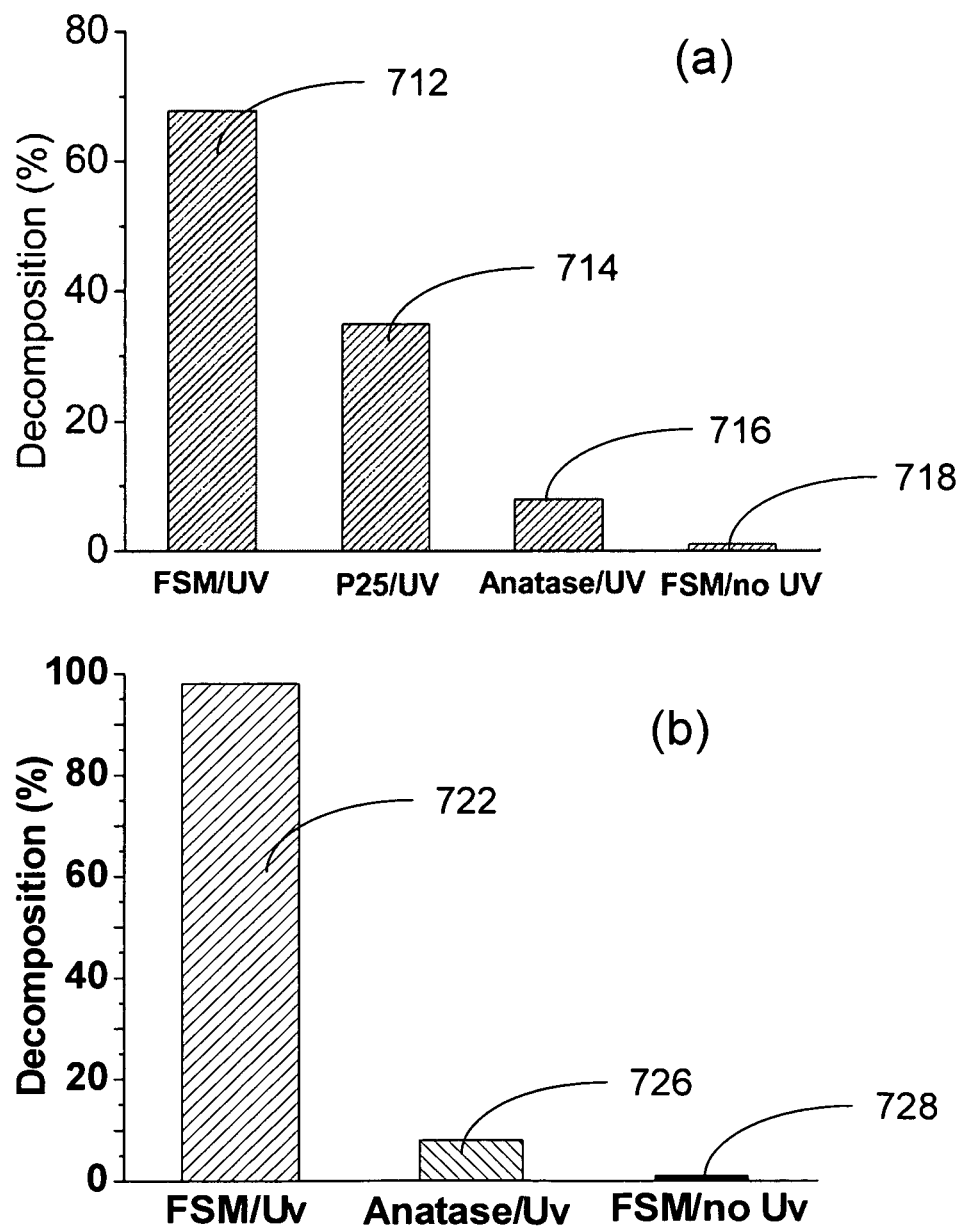
FIG. 7 shows photocatalytic decompositions of nerve agent simulants (NAS) by a $TiO_2$-containing FSM in water at RT according to two embodiments (a) and (b) of the present invention.
Figure 8:
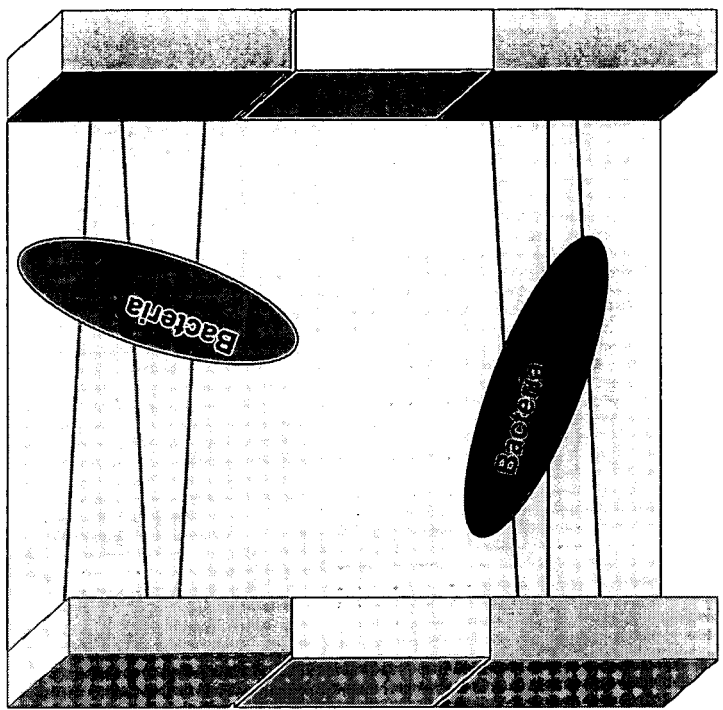
FIG. 8 shows (a) an image of a nanofiber FSM having the $TiO_2$-containing nanofibers intertwined to form porous nets, and (b) schematically a bacteria spores filter, according to one embodiment of the present invention.
Figure 8:
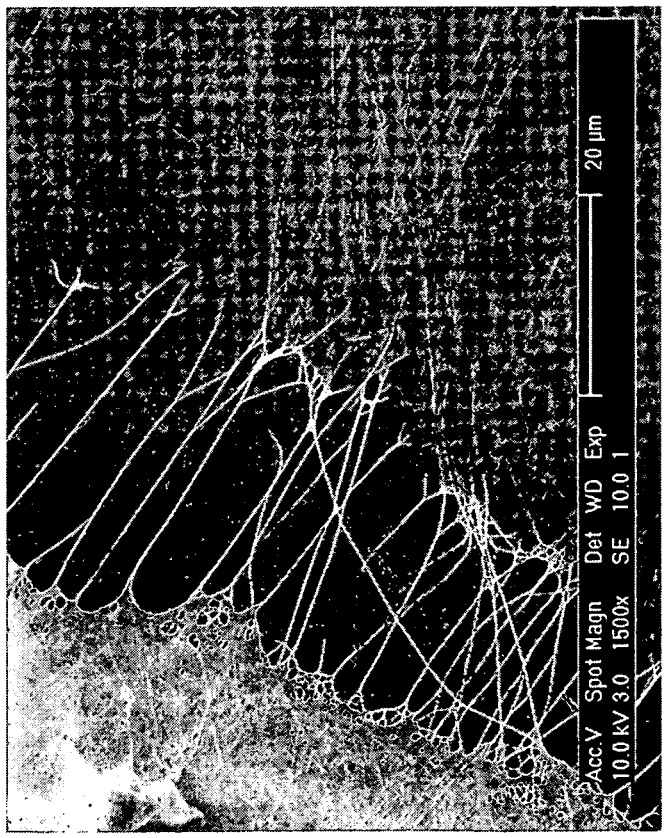

According the present invention, the $TiO_2$-containing, macro-sized nanostructures are formed in an environment that has no presence of a substrate that comprises Ti, such that the $TiO_2$-containing, macro-sized nanostructures comprise substantially nanofibers with a typical diameter in the range of about 20 nm to 150 nm and a typical length in the range of about hundreds of micrometers to few millimeters, as shown in FIGS. 3 and 4, for example. The nanofibers are substantially in the $TiO_2$—B phase or titanate phase.

Conventionally, TiO$_2$-containing nanostructures are produced by treating the TiO$_2$ powders in a concentrated solution of NaOH at a temperature about 150° C. [10] or lower temperatures. The nanostructures were formed on a substrate that is seeded with TiO2 powders. The resultant nanostructures comprise substantially nanotubes that are typically about several to tens of micrometers in length.

The synthetic process of the TiO$_2$-containing, macro-sized nanostructures according to the present invention, however, requires the heating temperature be greater than 160° C. for a period of time effective to allow TiO$_2$-containing, macro-sized nanostructures to form, and therefore results in macro-sized nanofibers about hundreds of micrometers to few millimeters in length, where the macro-sized nanofibers grow in an environment that has no presence of a substrate that is seeded with TiO2 powders. For example, in one embodiment, the macro-sized nanofibers were synthesized by first adding about 0.3 g of the TiO$_2$ powders (Degussa P25) into about 40 mL of 10 M alkali or alkaline solution in a 150 mL Teflon-lined autoclave container. The container was then sealed and heated in an oven for about 1-7 days at a temperature substantially above 160° C. for the growth of macro-sized nanofibers in length. Other containers can also be used to practice the current invention. After the reaction (growth), the synthesized nanofibers were washed with distilled water. The synthesized nanofibers were white and pulp-like and could be used to form FSMs and/or 3D structures including cups and tubes.

In another aspect, the present invention relates to TiO$_2$-containing, macro-sized nanostructures synthesized according to the above method.

In yet another aspect, the present invention relates to a synthetic nanostructure. The synthetic nanostructure includes a reaction product of a chemical reaction according to the formula of $$2NaOH + 3TiO_2 = Na_2Ti_3O_7 + H_2O,$$

where the chemical reaction takes place at a temperature higher than 160° C. for a period of time effective to allow the reaction product to form, and furthermore, the chemical reaction takes place in an environment that has no presence of a substrate that comprises Ti. In one embodiment, the chemical reaction takes place in a sealed container. The effective temperature is in the range of about 180-300° C. The effective period of time is in the range of about 3-960 hours.

A first reactant TiO$_2$ is provided in the form of powders, and a second reactant that comprises an inorganic base is provided in the form of solution. In one embodiment, the second reactant comprises NaOH and the reaction product comprises a compound of the formula Na$_2$Ti$_3$O$_7$. The compound of the formula Na$_2$Ti$_3$O$_7$ is in the form of nanofiber with a typical diameter in the range of 20 nm to 150 nm.

The synthesized nanofibers can be used to form 2D FSMs and/or 3D structures including cups and tubes.

For example, a two-dimensional (2D) FSM can be formed by the following steps: at first, a plurality of TiO$_2$-containing, macro-sized nanostructures are provided. Then the plurality of TiO$_2$-containing, macro-sized nanostructures is cast over a template film to form a free standing membrane over the template film. Next, the free standing membrane cast over the template film is dried at a temperature for a period of time. The temperature of drying is substantially in the range of about 0-180° C. The period of time of drying is substantially in the range of about 0.5-30 hours. Finally, the dried free standing membrane is removed from the template film by calcining the dried free standing membrane over the template film at a temperature in the range of 300-600° C. for the template film of an ashless filter paper, or by hand for the template film of a polyethylene film. The template film is substantially 2D.

The casting step has the steps of casting a first plurality of TiO$_2$-containing, macro-sized nanostructures over the template film; drying the first plurality of TiO$_2$-containing, macro-sized nanostructures cast over the template film at RT for a first period of time; subsequently casting at least one additional plurality of TiO$_2$-containing, macro-sized nanostructures over the dried first plurality of TiO$_2$-containing, macro-sized nanostructures cast over the template film; and drying the at least one additional plurality of TiO$_2$-containing, macro-sized nanostructures cast over the dried first collection of TiO$_2$-containing, macro-sized nanostructures cast over the template film at RT for a second period of time that is substantially different from or equal to the first period of time.

Accordingly, the 2D FSM is formed with multi-layers and has a thickness in a range of from tens to hundreds of micrometers. The thickness of the 2D FSM is determined by the amount of TiO$_2$-containing, macro-sized nanostructures cast over the template film. The TiO$_2$-containing nanofibers in each layer are at least partially intertwined, thereby forming voids therein. The 2D FSM is porous, permeable and zeolitic, chemically inert, biocompatible, and/or thermally stable, as shown below.

The above disclosed procedures can also be utility to fabricate a 3D structure directly from nanostructures. In this case, a template having a 3D configuration corresponding to the 3D structure to be formed is utilized, instead of a 2D film. Accordingly, the 3D structure has a wall portion formed with multi-layers. The TiO$_2$-containing nanofibers in each layer are at least partially intertwined, thereby forming voids therein. The wall portion of the 3D structure has a thickness in a range of from tens to hundreds of micrometers. At least a portion of the 3D structure is porous, permeable and zeolitic. The 3D structure is chemically inert, biocompatible, and/or thermally stable.

Referring to FIG. 1, a process 100 for forming a nanofiber cup 150 is schematically shown according to one embodiment of the present invention. At first, a macroscopic template or mold 110 is provided. The macroscopic template or mold 110 has a desired 3D structure and size and is made of an ashless filter-paper, a polyethylene film, or other materials. Then the macro-sized nanofibers synthesized according to the invented method(s) disclosed in this specification are cast over the macroscopic template or mold 110. The cast nanofiber cup 150 cast over the macroscopic template or mold 110 is dried at a temperature in the range of about 0-180° C. in an oven for the period of time in the range of about 0.5-30 hours. Thereafter, the template or mold 110 is simply removed by hand for a plastic template or burning out via the calcination at a temperature about 500° C. for a filter paper template, thereby resulting in the nanofiber cup 150 made of the inorganic nanofibers. The wall (membrane) thickness of the nanofiber cup 150 varies from tens to hundreds of micrometers, depending on the amount of the nanofibers used.

In one aspect, the present invention relates to a synthetic nanostructure. In one embodiment, the synthetic nanostructure includes a reaction product of several chemical reactions in sequence according to the formulae of:

$$2NaOH + 3TiO_2 \rightarrow Na_2Ti_3O_7; \quad (a)$$

$$Na_2Ti_3O_7 + 2H^+ \rightarrow 2Na^+ + H_2Ti_3O_7; \text{ and} \quad (b)$$

$$H_2Ti_3O_7 \rightarrow H_2O + TiO_2 - B, \quad (c)$$

where at least chemical reaction (a) takes place at a temperature higher than 160° C. for a period of time effective to allow the reaction product to form, and furthermore, the at least chemical reaction (a) takes place in an environment that has no presence of a substrate that comprises Ti. In one embodiment, the effective temperature is in the range of about 180-300° C. The effective period of time is in the range of about 3-960 hours.

In one embodiment, a first reactant $TiO_2$ is provided in the form of powders, and a second reactant that comprises an inorganic base is provided in the form of solution. The second reactant in one embodiment comprises NaOH. In another embodiment, the second reactant comprises $OH^-$. The reaction product comprises a compound of the formula $Na_2Ti_3O_7$. The compound of the formula $Na_2Ti_3O_7$ is in the form of macro-sized nanofibers with a typical diameter in the range of 20 nm to 150 nm.

In one embodiment, at least chemical reaction (a) takes place in a sealed container. Chemical reaction (b) takes place substantially between 180° C. and 300° C. for a period of time effective to allow the compound of the formula $H_2Ti_3O_7$ to form in the form of macro-sized nanofibers. Chemical reaction (c) takes place in a calcination process, where the calcination process can be a step of heating in a furnace at a temperature in the range of 300-600° C. in air and a step of burning in air.

The chemical reaction (c) causes the compound of the formula $TiO_2$—B to form in the form of macro-sized nanofibers, where the compound of the formula $TiO_2$—B as formed in the form of macro-sized nanofibers is with a typical diameter in the range of 20 nm to 150 nm.

In addition, the present invention can find many applications in a wide spectrum of fields, such as:
(1). membrane catalysts (no binders/supports/downstream separations),
(2). catalytic supports (membrane macropores support catalyst particles),
(3). catalytically decomposing pollutants, e.g., nerve agents, in water under UV light, about 12 times more powerful than the commercial $TiO_2$ powder,
(4). drug delivery (DNA, protein, and organic drugs can be stored in the voids or macropores for slow or controlled releases),
(5). tissue regeneration (tissue cells can grow in the biocompatible voids),
(6). solar cell and water photo-splitting,
(7). oil cracking,
(8). making and storing hydrogen for fuel cells,
(9). writing-erasing-rewriting of information,
(10). making multi-functional vests/coats for nanomedicine, battlefield and firefighter, etc., and
(11). making tire for vehicles.

These and other aspects of the present invention are more specifically described below.

IMPLEMENTATIONS AND EXAMPLES OF THE INVENTION

Without intent to limit the scope of the invention, exemplary methods and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

Example 1

Synthesizing $TiO_2$-Containing, Macro-Sized Nanofibers/Nanowires and Fabricating FSMs and 3D Devices According to the present invention, a synthetic route for the hydrothermal synthesis of $TiO_2$-containing, macro-sized nanofibers/nanowires at an effective temperature above 160° C. for an effective time period is disclosed.

In this exemplary embodiment, about 0.30 g of $TiO_2$ powder (Degussa P25) was introduced into about 40 mL of 10 M alkali solution in a 150 mL Teflon-lined autoclave container. The container was then sealed and placed in an oven for heating. After the hydrothermal reaction in the oven a temperature above 160° C. for about 7 days, a white pulp-like product of the TiO2-containing, macro-sized nanofibers was collected, washed with distilled water or a dilute acid. The washed white pulp-like product of the TiO2-containing, macro-sized nanofibers was cast on a macroscopic template made of either an ashless filter-paper (Whatman) or polyethylene film, and then dried at RT. This casting-drying process was repeated for several times at RT, and followed thereafter by a heating at about 0-180° C. in an oven for about 0.5-30 hours. Accordingly, a 2D FSM paper or a 3D cup was formed with the $TiO_2$-containing, macro-sized nanofibers on the macroscopic template. Then the macroscopic template was removed from the 2D FSM paper or the 3D cup. In this example, the macroscopic template includes a plastic plate or a cup.

Referring to FIGS. 2a and 2b, images of the nanofiber FSMs 210 and 220, and nanofiber membrane cups 250 and 260 are shown, respectively. FIG. 2a displays a plane FSM 210 and a folded FSM 220. The membrane size can be varied from several to tens of centimeters, depending on the amount of the nanofiber used. In practice, it has been noticed that slowly deposited FSMs easily survived from multiple bends and folds, revealing the robust nature of the paper-like FSM formed typically by long and flexible fibers and indicating that a longer time for the nanofibers to settle on (cast over) the template would substantially increase the robustness of the FSM. The correlation between the deposition time and the membrane flexibility (or robustness) implied that the FSM formation process was accompanied by a self-assembly of the nanofibers. The settling time was controlled by either the ratio of water to the nanofibers or the temperature for drying the nanofibers, or a combination of both. Inset in FIG. 2a demonstrates that the plane FSM 210 could be readily folded like a piece of paper to form a folded FSM 220, reflecting a flexible nature of the FSM formed by the long (macro-sized) nanofibers. The 1D nanostructure self-assembly is also shown in FIG. 14. For comparison, the image of a one cent coin 230 is also shown in FIG. 2a.

A systematic study on varying the fabrication parameters has suggested that the FSM paper's flexibility could be controlled by optimizing (a) the ratio of water to the nanowires in the pulp and (b) the time for drying the nanowire pulp. The preparation of such robust FSM has enabled one to directly cast the long nanowires, under the help of the 3D templates or molds, into macroscopic 3D devices such as tube, bowl, and cup, as shown in FIG. 2b. Such nanowire membrane devices, each weighing about 0.2-0.3 g and with a nearly 500 μm wall thickness, can be freely handled by hands and trimmed with scissors, which is among the first attempts to cast at RT a pure inorganic nanofiber-containing 3D ceramic device that can be cut by scissors.

As shown in FIG. 2b, macroscopic membrane nanofiber cups 250 and 260 were formed by casting the nanofibers over templates of an ashless filter-paper and a polyethylene film, respectively. The plastic template was detached by hand. The filter-paper template, however, was removed by the calcination at a temperature about 500° C. or burnt out by open flames in air. The macroscopic membrane nanofiber cups 250 and 260 were white, weighing about 0.3 grams. Such inorganic nanofiber vessels were different from those cast by the traditional ceramic engineering processes involving a firing at the temperatures near or above 1,000° C. For comparison, the image of a one cent coin 240 is also shown in FIG. 2b.

The successful casting of the FSMs or 3D membrane devices would depend on the morphology and spatial organization of the nanofibers. The long nanofibers can self-organize into the robust FSM and 3D membrane devices while nanoparticles or short nanofibers cannot. Further, the controlled assemblies of the nanofibers can determine the robustness of the 3D membrane device.

Surface morphologies and lateral structures of the $TiO_2$-containing, macro-sized nanofibers, the free standing membrane and 3D devices of the nanofibers according to embodiments of the present invention were characterized by means of a transmission electron microscope (TEM), a scanning electron microscope (SEM), and a field emission scanning electron microscope (FESEM), energy-dispersive X-ray analyses (EDX), and X-ray diffraction (XRD), respectively. The SEM and EDX work was done on a Philips ESEM XL30 microscope. The XRD data were collected on a Philips X'Pert X-ray diffractometer. The TEM study was carried out on a JEOL X-100 microscope and JEOL 2010 FEG STEM/TEM.

The SEM, FESEM and TEM images of the wall portion of a nanofiber cup according to one embodiment of the present invention were shown in FIGS. 3a-3c, respectively. As shown in FIG. 3a, the wall portion of the nanofiber cup was formed with multi-layers of self-aggregated nanofibers. The number of the layers was in line with the number of times that the nanofibers had been added on the template. The multi-layer structure of the cup membrane indicated that the air-drying process was accompanied by a spontaneous self-organization for the nanofibers. The nanofibers shown in FIG. 3a were less organized than those reported in literature [5, 8]. But, it could be anticipated that the nanofibers' organization would be improved by allowing a longer time for the self-organization at an elevated temperature, or by employing special techniques such as the "nano-logging" [11], magnetic field alignment [12], etc.

A high resolution FESEM photographic image of the cup wall portion shown in FIG. 3b revealed the microscopic details of the entangled nanofibers in the cup membrane, thereby forming 3D voids therein. The nanofibers had the diameters ranging from about 50 nm to about 100 nm, and the lengths most near about 1 mm or longer. Certain nanofibers, however, had the lengths about tens to hundreds of micrometers due probably to a continuous nucleation and/or an uneven growth commonly seen in a prolonged hydrothermal heating. The nanofibers in the cup wall portion were intertwined, thereby forming the 3D porous FSM with a controlled thickness about 0.1 mm. The thickness may be varied with the amount of nanofibers used. The 3D voids, about 0.5 to 10 micrometers in size, would be ideal for the nanofibers to expand during the heating or to move around in response to a mechanical stress, thus improving the thermal stability and mechanical strength of the FSM. Practically, these 3D macropores are useful for fast mass transport in catalysis and gas storage over a wide temperature range, thus differentiating this FSM from those reported elsewhere.

FIG. 3c was a TEM image of the nanofibers in the cup wall portion shown in FIG. 3b. As shown in FIG. 3c, the average diameter of the nanofibers was about 60 nm. Moreover, no nanotubes could be seen in this sample under the TEM. This result was in line with what had been reported in literature that the heating temperature higher than 160° C. in the hydrothermal synthesis would mainly result in nanofibers rather than nanotubes [13]. As disclosed above, the hydrothermal heating temperatures above 160° C. were employed in the present invention for the purpose of forming the pulp-like and long nanofibers.

XRD patterns of the nanofibers confirm that the 1D nanowire samples resemble the titanate in lattice structure [13]. The XRD data have suggested that thus-formed nanowires should be the titanate phase, which is characterized by the following lattice parameters: [2θ=9.8° (001), 11.2° (200), 24.4° (110), and 29.7° (003), (JCPDS card No.: 47-0561)]. The titanate structure's basic building unit is a $TiO_6$-octahedron [22]. The edge-shared ($TiO_6$) octahedra would form a negatively charged layered structure. The countercations (e.g., $Na^+$) sit in between the adjacent layers, thus resulting in variable interlayer distances depending on the size and the hydration degree of the cation, which would explain the flexibility of the long nanofibers [23].

The thermal stability of the nanofiber FSM was investigated by heating the membranes at temperatures above 500° C. in air for three hours. FIG. 4a shows that the inorganic nanofiber FSM retained the typical multi-layered texture after 3 hours of the calcination in a furnace at a temperature about 700° C. in air. FIG. 4b displays a FESEM picture for the inorganic nanofiber FSM after the calcination at a temperature about 700° C., showing clearly the fibrous nanostructures identical to those shown in FIG. 3b. Same results were obtained from samples being calcined at a temperature about 600° C. The TEM image in the inset of FIG. 4b demonstrates that the calcined FSM was mainly composed of the nanofibers with the same structure shown in FIG. 3c. After being calcined for 3 hours at a temperature about 800° C., however, the membrane nanofibers became much shorter and thicker than before, making the FSM no longer flexible that in turn suggested that the nanofiber structure experienced a phase transformation at about 800° C.

As shown in FIGS. 4a and 4b, after the 3 hours calcination period at 700° C. in air, the wall portion of the 3D objects still retained the characteristic multidecker structure of the entangled nanowires. After the calcination at 800° C., however, the wall membrane became brittle. This is because the original nanowire morphology has changed to one that is typically 20 μm long and 100-400 nm wide. The XRD data suggested that the nanowires should be in the $TiO_2$—B phase, which is characterized by the following lattice parameters: (a=12.1787, b=3.7412, c=6.5249 Å; β=107.0548°, after the calcination at 700° C., and then a mixture of $TiO_2$—B and anatase after the calcination at 800° C. Both XRD patterns agree well with the results reported in the literature [24]. Being different from other paper-like materials [6-8], this macroporous nanowire paper could be very useful in high-temperature catalysis. FIG. 4c shows an X-ray powder diffraction pattern of a paper of the $TiO_2$-containing long nanofibers before (410) and after (420) calcined at about 700° C. for about 3 hours.

FIG. 5a shows a high resolution FESEM image of a nanofiber FSM having the intertwined nanofibers. FIG. 5b shows images of various 3D structures such as nanofiber cups 550 and 560 and tube 570 in comparison with an image of one cent coin 530 according to embodiments of the present invention.

Briefly, the present invention, among other unique things, discloses methods of synthesizing $TiO_2$-containing, macrosized nanofibers and fabricating thermal-stable, robust, and multifunctional FSM-based 2D paper and 3D devices (e.g., tube, bowl, cup and so on) in nearly any macroscopic size and shape. Making long 1D nanostructures and then organizing them properly is critical in casting robust 2D FSMs directly out of the 1D nanomaterials. The inorganic 1D nanostructure is white, thermal stable, chemically inert, biocompatible, and capable of forming flexible mm-long nanofibers with the typical diameter less than 100 nm. Such inorganic nanofibers can form conformal membranes on macroscopic templates or molds of nearly any size for casting macroscopic vessels and tools by design. The nanofibers have attracted wide attentions due to their unique potentials in a wide range of applications including chemical sensing, photocatalysis, photovoltaics, varistors, gas sensors, and solar cells [9]. The nanofiber FSM and cup vessels are easily scaled up, and ideal for mass productions due to the use of the inexpensive raw $TiO_2$ material. Due to the known thermal stability and chemical inertness, such inorganic nanofiber FSM catalysts can be recyclable and reusable over a wide temperature range. The cast inorganic nanofiber FSMs, vessels, and tools may find uses in hydrogen storage [18] and generation [19], environmental cleaning [20], sensing [21], catalytically splitting water and cracking oil, making protection mask and armor, fabricating flame-retardant fabric, filtering bacteria, photoassisted rewriting, controlled drug releases, and regenerating tissues, and the likes.

Example 2

An immediate application of the $TiO_2$-containing, macro-sized nanofibers is to provide a writing-erasing-rewriting function for information storage under the help of the UV irradiation. $TiO_2$ is commonly utilized as an inexpensive and nontoxic photocatalyst. After being excited by UV light, the $TiO_2$ can catalyze dye degradation [25].

In this example, four characters, "UARK", of water-based ink ($1.0\times10^{-2}$ mol/L crystal violet) were written on a FSM paper 610 made of the $TiO_2$-containing, macro-sized nanofibers according to the present invention. The FSM paper 610 with the written information of "UARK" was exposed to the UV light in air. After 15 minutes of exposition to the UV light, all the four characters "UARK" were disappeared, as shown in FIG. 6*b*. This writing-erasing cycle had been repeated for four times on the FSM paper 610 (21.4 mg) in the example, all the four characters "UARK" were erased for each time after it was exposed to the UV light, as shown in FIG. 6*b*. For a regular printing paper 620, however, the UV irradiation in each time caused little change to the same characters that were written on the regular printing paper 620 (49.0 mg) in the first cycle. In addition, such inorganic nanofiber paper can be potentially useful in many harsh environments below 700° C.

Yearly, about 9.5 million hectares are deforested globally, and 35% of commercial wood is used for paper production [26]. Therefore, use of such rewritable, erasable, and heat-resistant inorganic nanofiber or nanowire paper might help save the disappearing forests.

Example 3

Another application of the $TiO_2$-containing, macro-sized nanofibers is in photocatalysis. The catalytic activity of the $TiO_2$—B phase has been demonstrated to be better than that of other $TiO_2$ phases [27]. Due to its macroporous nature, such robust nanowire-based membrane catalysts should have unique potentials for photocatalytic decompositions of organic pollutants [15] such as nerve agent simulants (NAS) [15], for example, $(C2H5O)_2P(O)(H2CSC6H5)$ (Aldrich).

In this exemplary embodiment, about 10 mg of the FSM made of the $TiO_2$-containing, macro-sized nanofibers according to the present invention was soaked in about 10 mL of 1 mol/L $Mg(NO_3)_2$ solution at RT for about 12 hours. The soaked FSM was dried at RT, and then heated at a temperature above 100° C. for about 3 hours in air. The heated FSM is then placed in a solution containing a number of organic pollutants. In the example, the organic pollutants comprise NAS. A UV lamp Entella (model B100 AP/R) was positioned about 5 mm above the solution with the FSM for VU irradiation the solution. The concentrations ($C_t$) of the NAS were measured on a UV-visible spectrometer, for example, HP 8453 (Hewlett-Packard, Co.).

After a 15 minute UV irradiation on the solution having the nanowire FSM at RT, the NAS concentration ($C_t$) was reduced by 67.8%, ($1-C_t/C_0$), from the initially NAS concentration ($C_0$) (about 50 mL, and $4.5\times10^{-7}$ mol/L originally). The decomposition rate ($1-C_t/C_0$) of the NAS concentration in the case is indicated by bar 712 of FIG. 7*a*, which is different from the literature results [17].

The spectroscopic measurements of the NAS concentrations were performed on the HP 8453 UV-visible spectrometer. Without the catalyst of the FSM, the NAS concentration decrease after the same UV irradiation was lower than the detection limit. Another blank test, using this FSM without the UV irradiation, caused the NAS concentration, as indicated by bar 718 of FIG. 7*a*, to decrease by about 1.0%, implying that nearly 66.8% of the NAS concentration drop (67.8%-1.0%) mainly attributes to the photocatalytic decomposition rather than the surface adsorption on the catalyst.

In the TEM/SEM/XRD studies, no MgO nanoparticles could be seen on the nanofiber catalyst. The EDX study, however, shows that about 0.85 wt % of the Mg element exists in this catalyst. Both results have implied that the Mg species would likely be in a form of highly dispersed cluster(s), which encourages one to do the HRTEM work to identify the shape/size and then the role of the Mg-containing particles in this photocatalysis.

Parallel tests using the P25 and anatase TiO2 powder (325 mesh, Alfa Aesar) of the same weight resulted in the reduction of the NAS concentration by 35.0% and 8.0%, as indicated by bars 714 and 716 of FIG. 7*a*, respectively. The FSM membrane is evidently far superior to the P25 and anatase powders in the NAS photodecomposition, suggesting that the nanowire FSM membrane could be an exciting new photocatalyst. During the UV irradiation, the solution temperature increase was negligible. In heterogeneous catalysis, utilizations of such nanowire FSM catalysts could minimize (i) the downstream separation and weight loss of catalysts, (ii) the use of catalytic supports and binders, and (iii) the cost due to the ease of recycling the catalyst via the calcination.

Example 4

As disclosed in EXAMPLE 3, $TiO_2$ is superb in photocatalytically decomposing organic pollutants including the nerve agent simulants (NAS) [15]. This is different from the catalyses on activated carbons [16] that have the dark color. Additionally, the $TiO_2$ photocatalytic activity can be greatly enhanced by the presence of Mg(II) [17]. In this exemplary study, the photocatalytic properties of the nanofiber FSM were studied at the RT in the aqueous solutions of the NAS that was the diethyl phenylthiomethylphosphonate (DPTMP, $C_{11}H_{17}O_3PS$) (Alfa Aesar).

Prior to the catalysis, the nanofiber FSM was firstly pretreated through a soaking in the solution of about 1 mol/L $Mg(NO_3)_2$ for about 12 hours at RT, then dried at RT and heated in air at a temperature above 100° C. for about 3 hours. The NAS solution was prepared by dissolving about 45 μmol of the DPTMP into about 100 mL water containing about 10 mg of the pretreated FSM. After a 15-min UV radiation from a lamp (Mineralight UVGL-58, λ=254 nm) that was positioned about 5 mm above the solution, the NAS concentration ($C_t$) in the solution was reduced by 98% ($1-C_t/C_0$), as indicated by bar 722 of FIG. 7b. The $C_t$ measurements were conducted on the HP 8453 UV-visible spectrometer. A blank test using the pretreated FSM of same weight without the UV radiation showed that the NAS concentration was decreased by only 1%, as indicated by bar 728 of FIG. 7b, which suggested that the NAS concentration drop of 98% was mainly due to the photocatalytic decomposition rather than the surface adsorption on the nanofibers. In parallel, the anatase $TiO_2$-powder (325 mesh, Alfa Aesar) of the same weight after the same pretreatment was used in this catalysis, resulting in a drop of the NAS $C_t$ by 8%, as indicated by bar 726 of FIG. 7b. No change in the solution temperature was observed after the UV radiations.

This 98% catalytic conversion may be further improved by the optimizations of the reaction temperature, the time and the intensity of the UV radiation, and the structure and morphology as well as loading of the Mg-species. This 98% conversion is among the highest in the fast photocatalytic decomposition of the NAS in water at RT, indicating an unusual potential of the nanofiber FSM catalysts for making, for instance, new masks in civil defense applications. In comparison with the common practice in heterogeneous catalyses, uses of the nanofiber FSM catalysts can minimize the downstream recovery of the powdery catalysts and at the same time eliminate the use of the catalytic supports and binders. In addition, a more efficient use of the surface of each catalytic nanofiber, a negligible weight loss of the catalyst, and reuses of the catalyst through the high-temperature calcination could all be expected. A further detailed development on controlling the structure, size, and dispersion of the Mg-species on the nanofibers, together with the optimization of the FSM porosity could lead to the development of new inorganic nanofiber membrane catalysts for a variety of important catalysis-related applications.

Example 5

The nanofiber FSMs and 3D devices according to the present invention can find applications in the filtration of particles. In this example, aqueous suspensions of polystyrene latex microspheres including Alfa Aesar microspheres with 0.75, 1, 2, and 2.5 μm in diameter were provided for investigating the permeability of the nanowire membrane [5]. Each aqueous suspension had a concentration of 0.0025% (wt). The microfiltration using a $TiO_2$-containing nanofiber cup (filter) was conducted within about 5 minutes. It had been shown that no 2-μm microspheres were detected in about 1 mL of the filtered sample (aqueous suspension). Those of 0.75 μm and 1 μm microspheres, however, penetrated the wall of the filter in the parallel tests, suggesting a size-exclusion function of the 3D devices in filtrations of micrometer-sized particles.

Furthermore, the $TiO_2$-containing nanofiber membrane can be used for filtrations of bacteria spores in civil defense, environmental cleaning, neuron growth media to repair injured spinal cord, treatments of Alzheimer's and Parkinson's diseases, inject-able bone repair, portable MEMS (Micro Electro Mechanical Sensor) biosensors and membrane chem-sensors. FIG. 8a shows an image of a nanofiber FSM having the $TiO_2$-containing nanofibers intertwined to form porous nets, which is used for the filtration of particles. FIG. 8b shows schematically a bacteria spores filtration using intertwined nanofibers.

Example 6

Figure 9:
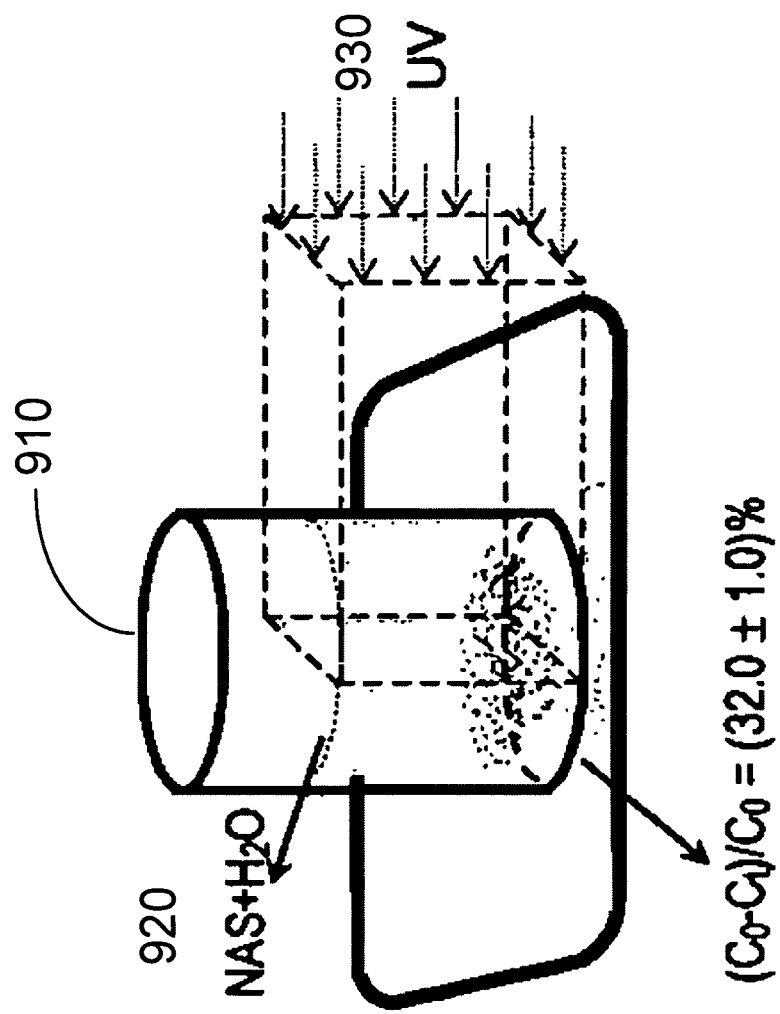
FIG. 9 shows schematically an integration of the permeation and the photocatalysis of a $TiO_2$-containing nanofiber membrane cup according to one embodiment of the present invention.

The unique integration of the permeation and the photocatalysis of a nanofiber membrane cup 910 according to the present invention were demonstrated in this example, as shown in FIG. 9. In this embodiment, the $TiO_2$-containing nanofiber membrane cup 910 was pretreated in a Mg(II) solution according to the method as shown in EXAMPLES 3 and 4, and then was filled with a NAS solution 920. The cup 910 containing the NAS solution 920 was irradiated by a UV light 930 emitted for a UV lamp (Entela, model B100 AP/R) from one side of the cup 910, as shown in FIG. 9. After 15 minutes of the UV irradiation, about 3.0 mL of the permeated-catalyzed solution was collected, with (32.0±1.0) % of the NAS instantly decomposed. If a circular UV lamp could be utilized around the cup 920, the concentration reduction could be comparable to that in the FIG. 7b (FSM/UV). This result demonstrates an application potential of the 3D devices in the industrial continuous flow-filtration-catalysis at different temperatures, where the reactant-catalyst contact time is limited.

Example 7

Figure 10:
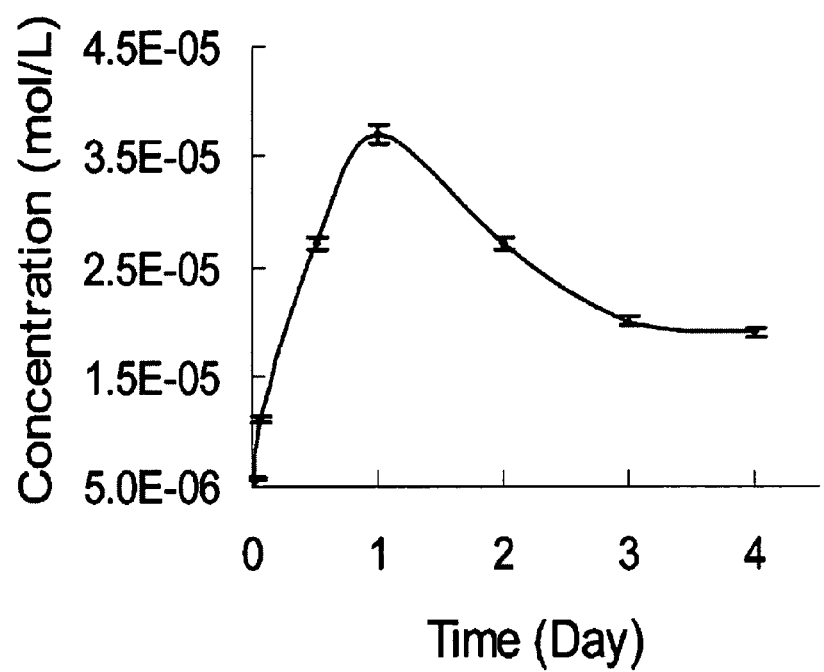
FIG. 10 shows the concentration of drug released by a $TiO_2$-containing nanofiber drug releaser in a solution according to one embodiment of the present invention.

Macroporous 3D devices, walled by the scaffolding nanowires/nanofibers, are useful in controlling drug release [29]. In the exemplary example, a section of the $TiO_2$-containing nanofiber FSM (74.0 mg) was pre-soaked in about 100 mL solution of about 0.001 mol/L crystal violet for about 12 hours at RT, and then placed in about 10 mL of fresh water at RT. The controlled drug release was monitored by the HP 8453 UV-visible spectrometer. After every 24 hours of the drug release, the $TiO_2$-containing nanofiber FSM was transferred into another 10 mL of fresh water. FIG. 10 shows the concentration of drug released from the $TiO_2$-containing nanofiber FSM in the solution, which indicated that the controlled drug release reached a maximum at about 24 hours, and was effective for at least 4 days.

Example 8

Furthermore, the 3D scaffolds of the $TiO_2$-containing nanofiber/nanowires, after being coated with growth hormone, is very useful in directing the growth of stem cells for potential applications in regenerative medicine [30, 31].

Example 9

Ceramic titanate nanowire (NW) is environmentally benign, biocompatible, chemically inert, surface functionalization easy, inexpensive, and thermally stable. In this example, a new composite is formed and usable for making tires. The new composite comprises $TiO_2$-containing, macro-sized nanowires/nanofiber that are blended with rubber polymer. In comparison with the carbon black-based rubber composite, the NW-rubber composite can be grey in color, and may provide the new tire with better interfacing with polymer backbone, higher mechanical strength and lighter in weight or better gas mileage, and easier in handling on wet roadway.

In the tire-making, the NW could be short or long, depending on the application need. The short NW is made at a temperature around 150-160° C. within a few hours. The long NW is made at a temperature above 160° C. and with a reaction time longer than 1 day.

Example 10

Figure 11:
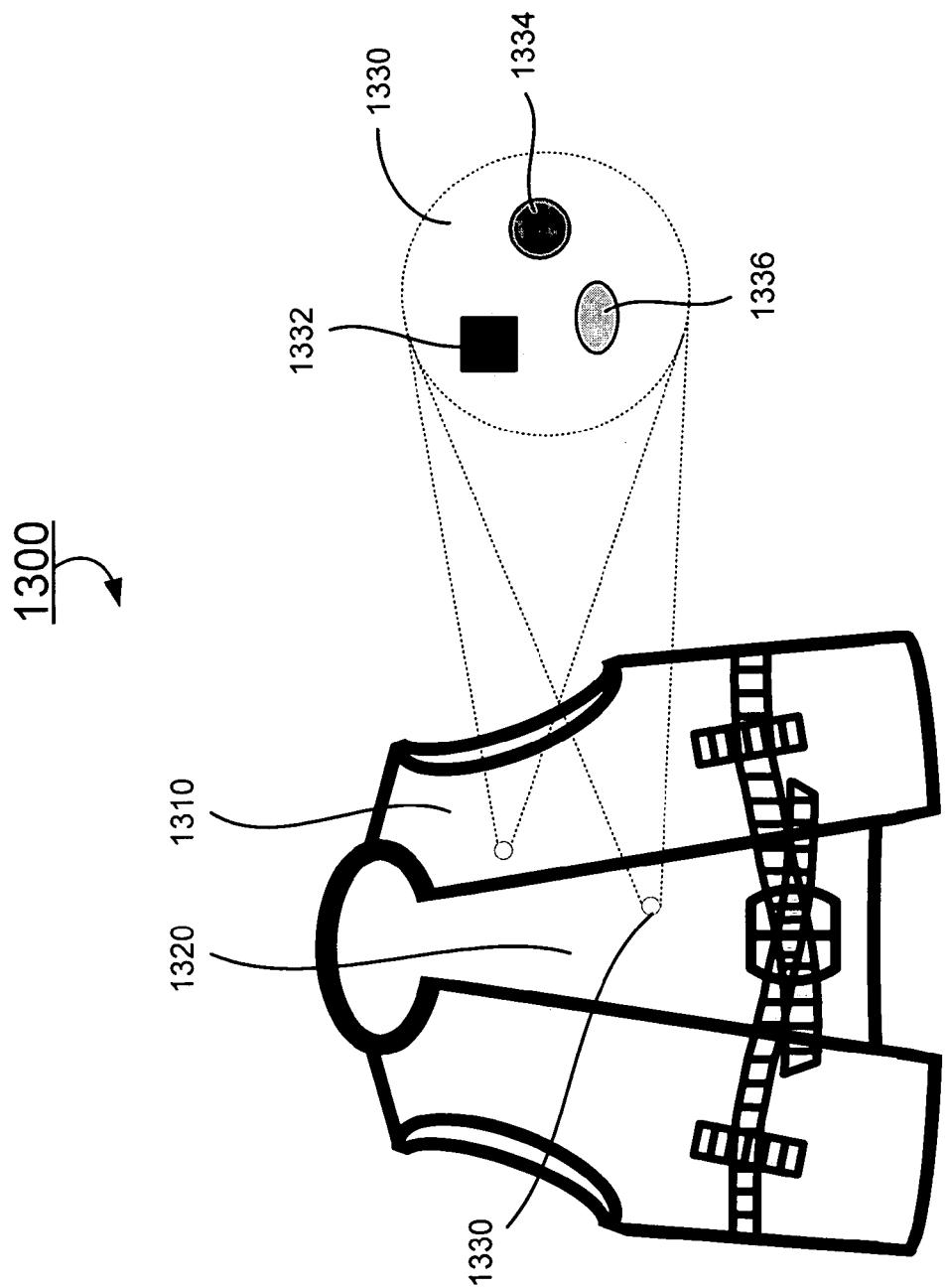
FIG. 11 shows schematically a multi-functional vest/coat made at least partially with the $TiO_2$-containing, macro-sized nanofiber fabric according to one embodiment of the present invention.

The $TiO_2$-containing, macro-sized nanofibers according to the present invention is also usable in making a multi-functional vest/coat for nanomedicine, battlefield, sports, space, firefighter, and the likes. A multi-functional vest/coat 1300 is made at least partially with the $TiO_2$-containing, macro-sized nanofiber fabric. For example, as shown in FIG. 11, the multi-functional vest/coat 1300 has a plurality of areas 1330 in a front and back panel 1310 and 1320 of the vest/coat 1300, which is made of the $TiO_2$-containing, macro-sized nanofiber fabric. Each of the plurality of areas includes one or more of a minimum-invasion nanodrug delivery MEMS 1332, heating-releasing cartridge of nanodrugs 1334, electrochemical nanobiosensor 1336, and the likes. These minimum-invasion nanodrug delivery MEMS 1332, heating-releasing cartridge of nanodrugs 1334, and electrochemical nanobiosensor 1336 are controllable, individually or in combination.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

LIST OF REFERENCES

[1]. Xia, Y., Yang, P., Sun, Y., Wu, Y., Mayers, B., Gates, B., Yin, Y., Kim, F., Yan, H. Adv. Mater. 2003, 15, 353.

[2]. (a) Whaley, S. R., English, D. S., Hu, E. L., Barbara, P. F., Belcher, A. M. Nature 2000, 405, 665. (b) Wei, B. Q., Vajtai, R., Jung, Y., Ward, J., Zhang, R., Ramanath, G., Ajayan, P. M. Chem. Mater. 2003, 15, 1598. (c) Yamaguchi, A., Uejo, F., Yoda, T., Uchida, T., Tanamura, Y., Yamashita, T., Teramae N. Nature Mater. 2004, 3, 337. (d) Jackson, A. M., Myerson, J. W., Stellacci F. Nature Mater. 2004, 3, 330.

[3]. Yang, H., Kuperman, A., Coombs, N., Mamiche-A., S., Ozin, G. A. Nature, 1996, 379, 703.

[4]. Ostomel, T. A., and Stucky, G. D. Chem. Commun. 2004, 1016

[5]. Yuan J., Laubernds K., Villegas J., Gomez S., Suib S. L. Adv. Mat. 2004, 16, 1729.

[6]. Gu G., Schmid M., Chiu P.-W., Minett A, Fraysse J., Kim G.-T., Roth S., Kozlov M., Muñoz E., Baughman R. H. Nature Mat. 2003, 2, 316.

[7]. Endo M., Muramatsu H., Hayashi T., Kim Y. A., Terrones M., Dresselhaus M. S. Nature 2005, 433, 476.

[8]. Zhang M., Fang S., Zakhidov A. A., Lee S. B., Aliev A. E., Williams C. D., Atkins K. R., Baughman R. H. Science, 2005, 309, 1215.

[9]. (a) Adachi, M., Murata, Y., Yoshikawa, S. Chem. Lett. 2000, 8, 942. (b) Uchida, S., Chiba, R., Tomiha, M., Masaki, N., Shirai, M. Electrochemistry 2002, 70, 418. (c) Adachi, M., Okada, I., Ngamsinlapasathian, S., Murata, Y., Yoshikawa, S. Electrochemistry 2002, 70, 449. (d) Hippe, C., Wark, M., Lork, E., Schulz-Ekloff, G. Microporous Mesoporous Mater. 1999, 31, 235. (e) Khitrov, G. MRS Bull. 2000, 25, 3. (f) Zhang, M., Bando, Y., Wada, K. J. Mater. Sci. Lett. 2001, 20, 167. (g) Zhang, M., Bando, Y., Wada, K. J. Mater. Res. 2001, 16, 1408. (h) Li, D., Xia, Y. N. Nano Lett. 2003, 3, 555. (i) Hoyer, P. Langmuir 1996, 12, 1411. (j) Liu, S. M., Gan, L. M., Liu, L. H., Zhang, W. D., Zeng, H. C. Chem. Mater. 2002, 14, 1391. (k) Kasuga, T., Hiramatsu, M., Hoson, A., Sekino, T., Niihara, K. Langmuir 1998, 14, 3160. (l) Kasuga, T., Hiramatsu, M., Hoson, A., Sekino, T., Niihara, K. Adv. Mater. 1999, 11, 1307. (m) Imai, H., Takei, Y., Shimizu, K., Matsuda, M., Hirashima, H. J. Mater. Chem. 1999, 9, 2971.

[10]. Tian, Z. R., Voigt, J, A., Liu, J., Mckenzie, B., Xu, H., J. Am. Chem. Soc., 2003, 125, 12384.

[11]. Whang, D., Jin, S., Wu, Y. & Lieber, C. M. Nano Lett. 2003, 3, 1255.

[12]. Tolbert, S. H., Firouzi, A., Stucky, G. D., Chmelka, B. F., Science 1997, 278: 264.

[13]. (a) Armstrong, A. R., Armstrong, G., Canales, J., Garcia, R., Bruce, P. G., Adv. Mater. 2005, 17, 862, (b) Armstrong, A. R., Armstrong, G., Canales, J., Bruce, P. G., Angew. Chem. Int. Ed. 2004, 43, 2286, (c) Yoshida, R., Suzuki, Y., Yoshikawa, S., J. Solid State Chem. 2005, 178, 2179,

[14]. (a) Marchand, R., Brohan, L., Tournoux, M., Mater. Res. Bull., 1980, 15, 1129, (b) Feist, T. P., Davies, P. K. J. Solid State Chem. 1992, 101, 275, (c) Yoshida, R., Suzuki, Y., Yoshikawa, S. J Solid State Chem. 2005, 178, 2179.

[15]. (a) Thompson, T. L., Yates, J. T., Jr. Topics in Catalysis 2005, 35(3-4), 197, (b) Thompson, T. L., Panayotov, D. A., Yates, J. T., Jr J. Phys. Chem. B 2004, 108(43), 16825, (c) Rusu, C. N., Yates, J. T., Jr J. Phys. Chem. B 2000, 104(51), 12299, (d) Rusu, C. N., Yates, J. T., Jr. J. Phys. Chem. B 2000, 104(51), 12292. (e) Moss, J. A., Szczepankiewicz, S. H., Park, E., Hoffman, M. R. J. Phys. Chem. B. 2005, 109, 19779.

[16]. 16. Surface and bulk measurements of metals deposited on activated carbon, S. H. Park, S. McClain, Z. R. Tian, O. Giraldo, H. Zhou, S. L. Suib, C. Karwacki, Chem. Mater. 1997, 9, 176

[17]. (a) Machli, M., Lemonidou, A. A. Catalysis Lett. 2005, 99, 221. (b) Tanabe, K., Hattori, H., Sumiyoshi, T., Tamaru, K., Kondo, T. J. Catalysis 1978, 53, 1.

[18]. (a) Bavykin, D. V., Lapkin, A. A., Plucinski, P. K., Friedrich, J. M., Walsh, F. C. J. Phys. Chem. B 2005, 109, 19422. (b) Lim, S. H., Luo, J., Zhong, Zi., Ji, W., Lin, J. Inorg. Chem. 2005, 44, 4124.

[19]. (a) Lin, C.-H., Lee, C.-H., Chao, J.-H., Kuo, C.-Y., Cheng, Y.-C., Huang, W.-N., Chang, H.-W., Huang, Y.-M., Shih, M.-K. Catalysis Lett. 2004, 98, 61. (b) Yin, S. F., Xu, B. Q., Zhu, W. X., Ng, C. F., Zhou, X. P., Au, C. T. Catalysis Today 2004, 93, 27. (c) Zein, S. H. S., Mohamed, A. R. Energy & Fuels 2004, 18, 1336.

[20]. Mor, G. K., Carvalho, M. A., Varghese, O. K., Pishko, M. V., Grimes, C. A. J. Mater. Res. 2004, 19, 628.

[21]. (a) Liu, S., Chen, A. Langmuir 2005, 21, 8409. (b) Varghese, O. K., Grimes, C. A. J. Nanosci. Nanotech. 2003, 3, 277. (c) Grimes, C. A., Ong, K. G., Varghese, O. K., Yang, X., Paulose, M., Dickey, E. C., Ruan, C., Pishko, M. V., Kendig, J. W., Mason, A. J. Sensors. 2003, 3, 69.

[22]. (a) Kim, Y. I., Salim, S., Huq, M., Mallouk, T. E. J. Am. Chem. Soc. 1991, 113, 9561. (b) Sasaki, T., Watanabe, M., Hashizume, H., Yamada, H., Nakazawa, H. J. Am. Chem. Soc. 1996, 118, 8329. (c) Sukpirom, N., Lerner, M. M. Chem. Mater. 2001, 13, 2179. (d) Izawa, H., Kikkawa, S., Koizumi, M. J. Phys. Chem. 1982, 86, 5023.

[23]. (a) Andersson, S., Wadsley, A. D. Acta Crystallogr. 1961, 14, 1245. (b) Andersson, S., Wadsley, A. D. Acta Crystallogr. 1962, 15, 194.

[24]. (a) Feist, T., Davies, P. K. J. Solid State Chem. 1992, 101, 275. (b) Zukalova, M., Kalbac, M., Kavan, L., Exnar, I., Graetzel, M., Zukalova, M. Chem. Mater. 2005, 17, 1248.

[25]. Senthilkumaar, S., Porkodi, K. J. Colloid Interface Sci. 2005, 288, 184.

[26]. Kishimura, A., Yamashita, T., Yamaguchi, K., Aida, T. Nature Mater. 2005, 4, 546.

[27]. Papachryssanthou, J., Bordes, E., Vejux, A., Courtine, P., Marchand R., Tournoux, M. Catal. Today 1987, 1, 219.

[28]. Thompson, T. L., Yates, J. T., Jr. Top. Catal. 2005, 35, 197.

[29]. Brokx, R. D., Bisland, S. K., Gariepy, J. J. Controlled Release 2002, 78, 115.

[30]. Silva, G. A., Czeisler, C, Niece, K. L., Beniash, E., Harrington, D. A., Kessler, J. A., Stupp, S. I. Science 2004, 303, 1352.

[31]. Stevens, M. M., Marini, R. P., Schaefer, D., Aronson, J., Langer, R., Shastri, V. P. Proc. Natl. Acad. Sci. U.S.A. 2005, 102, 11450.

What is claimed is:

1. A method for synthesizing $TiO_2$-based nanowires, comprising:
   (a) adding an amount of $TiO_2$ powders to a volume of an alkaline solution in a container to form a mixture, wherein the $TiO_2$ powders are dispersed throughout the mixture, and the mixture consists of the $TiO_2$ powder and the alkaline solution, wherein the alkaline solution is formed of an alkali material and water;
   (b) sealing the container containing the mixture;
   (c) heating the sealed container containing the mixture at a temperature higher than 160° C. for a period of time effective to allow $TiO_2$-based nanowires that are longer than about 1 mm to form;
   (d) forming, from the mixture, the $TiO_2$-based nanowires that are dispersed throughout the mixture and that are longer than about 1 mm, wherein the $TiO_2$-based nanowires are substantially in $TiO_2$—B phase or titanate phase; and
   (e) casting the $TiO_2$-based nanowires that are longer than about 1 mm over a template to allow a spontaneous self-organization of the nanowires to occur.

2. The method of claim 1, wherein the heating step comprises the step of placing the sealed container containing the mixture in an oven for heating.

3. The method of claim 1, wherein the sealed container containing the mixture is heated at a temperature in a range from about 180° C. to about 300° C.

4. The method of claim 1, wherein the mixture is heated for a period of time in a range from about 3 hours to about 960 hours.

5. The method of claim 1, further comprising the step of washing the formed $TiO_2$-based nanowires with distilled water or a dilute acid.

6. The method of claim 1, wherein the alkali solution comprises at least one of sodium hydroxide (NaOH), potassium hydroxide (KOH), lithium hydroxide (LiOH), rubidium hydroxide (RbOH), cesium hydroxide (CsOH), and any combinations of them.

7. The method of claim 1, wherein the alkaline solution comprises one of magnesium hydroxide [$Mg(OH)_2$], calcium hydroxide [$Ca(OH)_2$], strontium hydroxide [$Sr(OH)_2$], barium hydroxide [$Ba(OH)_2$], and any combinations of them.

8. The method of claim 1, wherein the amount of $TiO_2$ powders comprises about 0.3 g of $TiO_2$ powders.

9. The method of claim 1, wherein the volume of alkali or alkaline solution comprises about 40 mL of 10 M alkali or alkaline solution.

10. The method of claim 1, wherein the formed $TiO_2$-based nanowires each have a diameter in a range from about 20 nanometers to about 150 nanometers.

11. The method of claim 1, wherein the $TiO_2$ powders comprise anatase $TiO_2$ powders.

* * * * *